US009823494B2

(12) United States Patent
Blum et al.

(10) Patent No.: US 9,823,494 B2
(45) Date of Patent: Nov. 21, 2017

(54) WEARABLE CAMERA SYSTEMS AND APPARATUS AND METHOD FOR ATTACHING CAMERA SYSTEMS OR OTHER ELECTRONIC DEVICES TO WEARABLE ARTICLES

(71) Applicant: PogoTec, Inc., Roanoke, VA (US)

(72) Inventors: Ronald D. Blum, Roanoke, VA (US); William Kokonaski, Gig Harbor, WA (US); Richard Clompus, Trinidad, CA (US); Walter Dannhardt, Roanoke, VA (US); Amitava Gupta, Roanoke, VA (US); Bobi Arnold, Roanoke, VA (US); Massimo Pinazza, Domegge di Cadore (IT); Claudio Dalla Longa, Valdobbiadene (IT)

(73) Assignee: PogoTec, Inc., Roanoke, VA (US)

( * ) Notice: Subject to any disclaimer, the term of this patent is extended or adjusted under 35 U.S.C. 154(b) by 85 days.

(21) Appl. No.: 14/816,995

(22) Filed: Aug. 3, 2015

(65) Prior Publication Data

US 2016/0033792 A1 Feb. 4, 2016

Related U.S. Application Data

(60) Provisional application No. 62/032,589, filed on Aug. 3, 2014, provisional application No. 62/045,246, filed on Sep. 3, 2014, provisional application No. 62/086,747, filed on Dec. 3, 2014, provisional application No. 62/091,697, filed on Dec. 15, 2014, (Continued)

(51) Int. Cl.

| | |
|---|---|
| ***H04N 5/228*** | (2006.01) |
| ***G02C 11/00*** | (2006.01) |
| ***G02C 5/14*** | (2006.01) |
| ***H04N 5/225*** | (2006.01) |
| ***G06F 3/16*** | (2006.01) |

(52) U.S. Cl.

CPC ................ *G02C 11/10* (2013.01); *G02C 5/14* (2013.01); *G06F 3/167* (2013.01); *H04N 5/2251* (2013.01); *G02C 2200/02* (2013.01); *G02C 2200/16* (2013.01)

(58) Field of Classification Search

CPC ...... G02C 11/10; G02C 5/14; G02C 2200/02; G02C 2200/16; G06F 3/167; H04N 5/2251

USPC ........................................... 348/222.1; 345/8

See application file for complete search history.

(56) References Cited

U.S. PATENT DOCUMENTS

| | | |
|---|---|---|
| 3,476,467 A | 11/1969 | Curry |
| 3,593,449 A | 7/1971 | Nielson |

(Continued)

FOREIGN PATENT DOCUMENTS

| | | |
|---|---|---|
| CA | 154079 S | 12/2014 |
| CN | 201318005 | 9/2009 |

(Continued)

OTHER PUBLICATIONS

First Office Action for ROC (Taiwan) Patent Appl. No. 104125151 dated Jul. 29, 2016.

(Continued)

*Primary Examiner* — Yogesh Aggarwal
(74) *Attorney, Agent, or Firm* — Dorsey & Whitney LLP

(57) ABSTRACT

Wearable electronic devices, for example wearable camera systems, and methods for attaching electronic devices such as camera systems to eyewear or other wearable articles are described.

32 Claims, 27 Drawing Sheets

100 110 113 112 134 137 132 154 124 122 120 136 130 105

Related U.S. Application Data provisional application No. 62/153,999, filed on Apr. 28, 2015, provisional application No. 62/048,820, filed on Sep. 11, 2014, provisional application No. 62/052,910, filed on Sep. 19, 2014, provisional application No. 62/053,275, filed on Sep. 22, 2014, provisional application No. 62/140,276, filed on Mar. 30, 2015, provisional application No. 62/154,007, filed on Apr. 28, 2015, provisional application No. 62/080,437, filed on Nov. 17, 2014.

(56) References Cited

U.S. PATENT DOCUMENTS 3,780,918 A 12/1973 Curtis
4,379,988 A 4/1983 Mattatall
4,405,213 A 9/1983 Kolkmann
4,457,461 A 7/1984 Docking et al.
4,506,961 A 3/1985 Palmieri
4,516,157 A 5/1985 Campbell
4,781,315 A 11/1988 Nordskog
4,816,031 A 3/1989 Pfoff
4,845,755 A 7/1989 Busch et al.
4,918,737 A 4/1990 Luethi
5,181,051 A 1/1993 Townsend et al.
D354,505 S 1/1995 Francavilla
5,416,537 A 5/1995 Sadler
5,568,207 A 10/1996 Chao
5,606,743 A 2/1997 Vogt et al.
5,608,808 A 3/1997 Da Silva
5,623,703 A 4/1997 Takagi et al.
5,636,775 A 6/1997 Kartsotis et al.
D385,290 S 10/1997 Totsuka et al.
5,786,789 A 7/1998 Janky
5,913,815 A 6/1999 Ball et al.
5,915,588 A 6/1999 Stoken et al.
6,028,413 A 2/2000 Brockmann
6,076,927 A 6/2000 Owens
6,091,546 A 7/2000 Spitzer
6,157,291 A 12/2000 Kuenster et al.
6,215,460 B1 4/2001 Mizoguchi et al.
6,275,681 B1 8/2001 Vega et al.
6,282,302 B1 * 8/2001 Hara .................. G06K 9/00013 382/116
6,735,897 B1 5/2004 Schmitter
6,783,238 B1 8/2004 Stepper
6,977,479 B2 12/2005 Hsu
7,003,353 B1 2/2006 Parkhouse
7,092,763 B1 8/2006 Griffith et al.
7,126,558 B1 10/2006 Dempski
D531,656 S 11/2006 Della Valle
7,158,096 B1 1/2007 Spitzer
7,203,134 B1 4/2007 Jackson
7,229,168 B2 6/2007 Kidouchim
7,236,356 B2 6/2007 Ulla et al.
7,320,514 B2 1/2008 Smith
D563,454 S 3/2008 Miklitarian
7,409,234 B2 8/2008 Glezerman
7,435,019 B2 10/2008 Lee
7,597,440 B1 10/2009 Magal
7,618,260 B2 11/2009 Daniel et al.
7,684,868 B2 3/2010 Tai et al.
7,793,361 B2 9/2010 Ishihara et al.
7,937,880 B1 5/2011 Fidlow
7,979,963 B2 7/2011 Lee-Holowka et al.
7,988,283 B2 8/2011 Jannard
8,046,948 B2 11/2011 Mauch et al.
8,068,169 B2 11/2011 Chang
D650,411 S 12/2011 Fuchs
D653,202 S 1/2012 Hasbrook et al.
8,109,629 B2 2/2012 Howell et al.
8,111,042 B2 2/2012 Bennett
8,123,352 B2 2/2012 Matsumoto et al.
D659,094 S 5/2012 Brand et al.
8,175,660 B2 5/2012 Porwal
8,193,781 B2 6/2012 Lin et al.
D666,144 S 8/2012 Brand et al.
8,299,877 B2 10/2012 Hong et al.
D670,703 S 11/2012 Hasbrook et al.
D671,493 S 11/2012 Hasbrook et al.
8,334,620 B2 12/2012 Park et al.
D675,625 S 2/2013 Hasbrook et al.
D675,668 S 2/2013 Johnson et al.
D676,432 S 2/2013 Hasbrook et al.
8,367,235 B2 2/2013 Huang
8,378,524 B2 2/2013 Mita
8,401,595 B2 3/2013 Zhu et al.
8,432,129 B2 4/2013 Lee et al.
D682,914 S 5/2013 Fuchs
8,469,508 B2 6/2013 Silver et al.
8,473,004 B2 6/2013 Warren
8,493,287 B2 7/2013 Yamamoto
8,534,514 B2 9/2013 Zhu et al.
8,541,975 B2 9/2013 Park et al.
8,571,609 B2 10/2013 Hwang et al.
8,587,241 B2 11/2013 Maeda
8,653,909 B2 2/2014 Park et al.
D704,765 S 5/2014 Markovitz et al.
8,716,899 B2 5/2014 Yi et al.
8,754,548 B2 6/2014 Hong et al.
8,778,022 B2 7/2014 Blum et al.
8,787,970 B2 7/2014 Warren
D712,452 S 9/2014 Fuchs
8,823,215 B2 9/2014 Park et al.
8,829,724 B2 9/2014 Ryu et al.
8,830,888 B2 9/2014 Shin et al.
8,842,635 B2 9/2014 Kim et al.
8,868,140 B2 10/2014 Zhu et al.
8,890,954 B2 11/2014 O'Donnell et al.
8,896,694 B2 11/2014 O'Donnell et al.
8,915,588 B2 12/2014 Blum et al.
8,922,161 B2 12/2014 Choi et al.
D720,800 S 1/2015 Shin
8,927,881 B2 1/2015 Wittenberg et al.
8,929,245 B2 1/2015 Sivanesan et al.
8,931,896 B2 1/2015 Blum et al.
8,934,045 B2 1/2015 Karn et al.
8,957,629 B2 2/2015 Ryu et al.
8,971,039 B2 3/2015 Huang et al.
8,987,942 B2 3/2015 Kim et al.
D726,140 S 4/2015 Park et al.
D729,650 S 5/2015 Phillips et al.
9,024,484 B2 5/2015 Park et al.
9,026,165 B2 5/2015 Kim et al.
9,030,052 B2 5/2015 Kim et al.
9,048,682 B2 6/2015 Lee et al.
9,048,683 B2 6/2015 Lee et al.
9,048,695 B2 6/2015 Hwang et al.
9,065,488 B2 6/2015 Kim et al.
9,075,249 B2 7/2015 Heinrich et al.
9,088,167 B2 7/2015 Kim et al.
9,088,171 B2 7/2015 Won et al.
D737,889 S 9/2015 Yoo
9,122,083 B2 9/2015 Blum et al.
D741,943 S 10/2015 Keplinger
9,152,130 B2 10/2015 Pattikonda et al.
D742,372 S 11/2015 Christopher et al.
D743,477 S 11/2015 Strecker
D743,479 S 11/2015 Keplinger
D745,922 S 12/2015 Shen
D746,358 S 12/2015 Markovitz et al.
D755,787 S 5/2016 Zander et al.
9,380,374 B2 6/2016 Sprague et al.
D763,951 S 8/2016 Chae
D765,765 S 9/2016 Clegg
D766,770 S 9/2016 Devaney et al.
D767,013 S 9/2016 Hsu
D767,014 S 9/2016 Fuchs
D772,330 S 11/2016 Hsu
9,628,707 B2 4/2017 Blum et al.
9,635,222 B2 4/2017 Blum et al.
D787,582 S 5/2017 Desodt et al.
2004/0080299 A1 4/2004 Forster et al.
2004/0088051 A1 5/2004 Seligman

(56) References Cited

U.S. PATENT DOCUMENTS

2005/0046786 A1 3/2005 Smith
2005/0083579 A1 4/2005 Volkenandt et al.
2005/0088811 A1 4/2005 Ulla et al.
2005/0167558 A1 8/2005 Smith
2005/0248717 A1 11/2005 Howell et al.
2006/0004546 A1 1/2006 Slanec
2006/0034478 A1 2/2006 Davenport
2006/0055786 A1* 3/2006 Ollila .................. H04N 5/2252 348/207.99
2006/0082730 A1 4/2006 Franks
2006/0095128 A1 5/2006 Blum et al.
2006/0121639 A1 6/2006 Tai et al.
2006/0268217 A1 11/2006 Teng
2007/0009253 A1 1/2007 Nikkanen et al.
2007/0013864 A1 1/2007 Dietz
2007/0023496 A1 2/2007 Hall
2007/0030442 A1* 2/2007 Howell .................. G02C 11/10 351/158
2007/0153639 A1 7/2007 Lafever et al.
2008/0034637 A1 2/2008 Summers
2008/0088791 A1 4/2008 Smith
2008/0116847 A1 5/2008 Loke et al.
2008/0160537 A1 7/2008 Weinberg et al.
2008/0163536 A1 7/2008 Koch et al.
2008/0208335 A1 8/2008 Blum et al.
2008/0231721 A1 9/2008 Chou et al.
2008/0259269 A1 10/2008 Grogan et al.
2008/0301846 A1 12/2008 Brillouet
2009/0009410 A1 1/2009 Dolgin et al.
2009/0040308 A1 2/2009 Temovskiy
2009/0110386 A1 4/2009 Kamada et al.
2009/0173760 A1 7/2009 Good
2009/0207701 A1 8/2009 Jacques
2009/0243397 A1 10/2009 Cook et al.
2009/0251661 A1 10/2009 Fuziak, Jr.
2009/0264966 A1 10/2009 Blum et al.
2010/0036773 A1 2/2010 Bennett
2010/0045114 A1 2/2010 Sample et al.
2010/0053555 A1 3/2010 Enriquez et al.
2010/0073262 A1 3/2010 Matsumoto
2010/0103076 A1 4/2010 Yamamoto
2010/0157432 A1 6/2010 Sugihara et al.
2010/0164295 A1 7/2010 Ichikawa et al.
2010/0174629 A1 7/2010 Taylor et al.
2010/0177476 A1 7/2010 Hotelling et al.
2010/0187910 A1 7/2010 Brengauz
2010/0245757 A1 9/2010 Sugihara et al.
2010/0284683 A1 11/2010 Fressola et al.
2010/0319096 A1 12/2010 Scott et al.
2011/0115429 A1 5/2011 Toivola et al.
2011/0121042 A1 5/2011 Weiss
2011/0156639 A1 6/2011 Ryu et al.
2011/0184320 A1 7/2011 Shipps et al.
2011/0185538 A1 8/2011 Hotellier et al.
2011/0188677 A1 8/2011 Rothkopf et al.
2011/0193963 A1 8/2011 Hess et al.
2011/0221389 A1 9/2011 Won et al.
2011/0221390 A1 9/2011 Won et al.
2011/0222154 A1 9/2011 Choi et al.
2011/0225073 A1 9/2011 Won et al.
2011/0234012 A1 9/2011 Yi et al.
2011/0241438 A1 10/2011 Kim et al.
2011/0241612 A1 10/2011 Ryu et al.
2012/0062173 A1 3/2012 Choi et al.
2012/0075571 A1 3/2012 Silver
2012/0081658 A1 4/2012 Sugihara et al.
2012/0105740 A1 5/2012 Jannard et al.
2012/0127423 A1 5/2012 Blum et al.
2012/0153903 A1 6/2012 Kim et al.
2012/0164943 A1 6/2012 Bennett
2012/0169278 A1 7/2012 Choi et al.
2012/0189146 A1 7/2012 Wuidart
2012/0193996 A1 8/2012 Ryu et al.
2012/0280575 A1 11/2012 Kim et al.
2012/0286581 A1 11/2012 Ryu et al.
2012/0286582 A1 11/2012 Kim et al.
2012/0286726 A1 11/2012 Kim et al.
2012/0293008 A1 11/2012 Park et al.
2012/0293009 A1 11/2012 Kim et al.
2012/0293010 A1 11/2012 Lee et al.
2012/0294478 A1 11/2012 Publicover et al.
2012/0299390 A1 11/2012 Kim et al.
2012/0300872 A1 11/2012 Kim et al.
2012/0306269 A1 12/2012 Kim et al.
2012/0306284 A1 12/2012 Lee et al.
2012/0309304 A1 12/2012 Kim et al.
2012/0309305 A1 12/2012 Kim et al.
2012/0309306 A1 12/2012 Kim et al.
2012/0309308 A1 12/2012 Kim et al.
2012/0313445 A1 12/2012 Park et al.
2012/0313447 A1 12/2012 Park et al.
2012/0328043 A1 12/2012 Kwon et al.
2012/0329405 A1 12/2012 Lee et al.
2013/0015813 A1 1/2013 Kim et al.
2013/0026847 A1 1/2013 Kim et al.
2013/0033117 A1 2/2013 Kim et al.
2013/0035034 A1 2/2013 Kim et al.
2013/0039395 A1 2/2013 Norconk et al.
2013/0043734 A1 2/2013 Stone et al.
2013/0043737 A1 2/2013 Yeo et al.
2013/0049456 A1 2/2013 Kim et al.
2013/0049483 A1 2/2013 Kim et al.
2013/0057079 A1 3/2013 Park et al.
2013/0058379 A1 3/2013 Kim et al.
2013/0058380 A1 3/2013 Kim et al.
2013/0059533 A1 3/2013 Kwon et al.
2013/0062963 A1 3/2013 Chernokalov et al.
2013/0062964 A1 3/2013 Chernokalov et al.
2013/0062965 A1 3/2013 Chernokalov et al.
2013/0063082 A1 3/2013 Lee et al.
2013/0063083 A1 3/2013 Park et al.
2013/0063873 A1 3/2013 Wodrich et al.
2013/0082651 A1 4/2013 Park et al.
2013/0093255 A1 4/2013 Jung et al.
2013/0099588 A1 4/2013 Yeo et al.
2013/0099591 A1 4/2013 Yeo et al.
2013/0099732 A1 4/2013 Lee et al.
2013/0099733 A1 4/2013 Park et al.
2013/0099734 A1 4/2013 Lee et al.
2013/0101133 A1 4/2013 Yoon et al.
2013/0113296 A1 5/2013 Ryu et al.
2013/0113298 A1 5/2013 Ryu et al.
2013/0119780 A1 5/2013 Kim et al.
2013/0119929 A1 5/2013 Partovi
2013/0127410 A1 5/2013 Park et al.
2013/0130621 A1 5/2013 Kim et al.
2013/0134791 A1 5/2013 Park et al.
2013/0134927 A1 5/2013 Park et al.
2013/0147427 A1 6/2013 Polu et al.
2013/0154387 A1 6/2013 Lee et al.
2013/0154557 A1 6/2013 Lee et al.
2013/0154558 A1 6/2013 Lee et al.
2013/0162200 A1 6/2013 Terry et al.
2013/0176652 A1 7/2013 Kim et al.
2013/0176653 A1 7/2013 Kim et al.
2013/0181665 A1 7/2013 Lee et al.
2013/0187475 A1 7/2013 Vendik et al.
2013/0187598 A1 7/2013 Park et al.
2013/0200844 A1 8/2013 Lee et al.
2013/0207479 A1 8/2013 Vendik et al.
2013/0207851 A1 8/2013 Dabov
2013/0210378 A1 8/2013 Zhu et al.
2013/0214734 A1 8/2013 Kang et al.
2013/0214735 A1 8/2013 Kang et al.
2013/0215374 A1 8/2013 Blum et al.
2013/0216085 A1 8/2013 Honeycutt
2013/0221912 A1 8/2013 Kang et al.
2013/0221914 A1 8/2013 Kim et al.
2013/0221915 A1 8/2013 Son et al.
2013/0225082 A1 8/2013 Kang et al.
2013/0229614 A1 9/2013 Marini et al.
2013/0235332 A1 9/2013 Blum et al.
2013/0241308 A1 9/2013 Bilbrey et al.
2013/0249306 A1 9/2013 Kim et al.

(56) References Cited

U.S. PATENT DOCUMENTS

2013/0250135 A1 9/2013 Blum et al.
2013/0264997 A1 10/2013 Lee et al.
2013/0270920 A1 10/2013 Yoon et al.
2013/0273072 A1 10/2013 Yoon et al.
2013/0278207 A1 10/2013 Yoo
2013/0282117 A1 10/2013 Van Heugten et al.
2013/0320736 A1 12/2013 Teufel et al.
2013/0329183 A1 12/2013 Blum et al.
2014/0021796 A1 1/2014 Song et al.
2014/0022765 A1 1/2014 Waters
2014/0027521 A1 1/2014 Pedicano et al.
2014/0043580 A1 2/2014 Steele
2014/0044281 A1 2/2014 Ganem et al.
2014/0049211 A1 2/2014 Park et al.
2014/0058506 A1 2/2014 Tai et al.
2014/0062395 A1 3/2014 Kwon
2014/0070623 A1 3/2014 Keeling et al.
2014/0070624 A1 3/2014 Kim et al.
2014/0070625 A1 3/2014 Kim et al.
2014/0071644 A1 3/2014 Yoon et al.
2014/0077613 A1 3/2014 Song et al.
2014/0077614 A1 3/2014 Park et al.
2014/0084688 A1 3/2014 Tzanidis et al.
2014/0084858 A1 3/2014 Kim et al.
2014/0103873 A1 4/2014 Partovi et al.
2014/0111018 A1 4/2014 Kwon et al.
2014/0111153 A1 4/2014 Kwon et al.
2014/0113689 A1 4/2014 Lee
2014/0125278 A1 5/2014 Kim et al.
2014/0135592 A1 5/2014 Ohnemus et al.
2014/0139180 A1 5/2014 Kim et al.
2014/0139637 A1 5/2014 Mistry et al.
2014/0146282 A1 5/2014 Lu
2014/0152116 A1 6/2014 Kim et al.
2014/0152516 A1 6/2014 Kim et al.
2014/0159654 A1 6/2014 Lee et al.
2014/0183967 A1 7/2014 Ryu et al.
2014/0191593 A1 7/2014 Moh
2014/0197785 A1 7/2014 Lee et al.
2014/0203657 A1 7/2014 Song et al.
2014/0232980 A1 8/2014 Harms et al.
2014/0239280 A1 8/2014 Takada et al.
2014/0241555 A1 8/2014 Terlizzi
2014/0252875 A1 9/2014 Lee
2014/0253028 A1 9/2014 Lee et al.
2014/0253322 A1 9/2014 Chapin
2014/0265614 A1 9/2014 Kim et al.
2014/0265615 A1 9/2014 Kim et al.
2014/0266020 A1 9/2014 van Lammeren et al.
2014/0266988 A1* 9/2014 Fisher .................. G02B 27/017 345/8
2014/0267874 A1 9/2014 Ratcliff et al.
2014/0268017 A1 9/2014 Sweis et al.
2014/0285139 A1 9/2014 Ahn et al.
2014/0285141 A1 9/2014 Lee et al.
2014/0285142 A1 9/2014 Lee et al.
2014/0285416 A1 9/2014 Priyantha et al.
2014/0308937 A1 10/2014 Wilson et al.
2014/0312834 A1 10/2014 Tanabe et al.
2014/0313471 A1 10/2014 Eubanks
2014/0327319 A1 11/2014 Byun et al.
2014/0327393 A1 11/2014 Lee et al.
2014/0327409 A1 11/2014 Lee et al.
2014/0340033 A1 11/2014 Kim et al.
2014/0346888 A1 11/2014 Kim et al.
2014/0347006 A1 11/2014 Kim et al.
2014/0354880 A1 12/2014 Han
2014/0361736 A1 12/2014 Kwon et al.
2014/0361738 A1 12/2014 Lee et al.
2014/0375246 A1 12/2014 Boysen, III et al.
2014/0375256 A1 12/2014 Lee et al.
2015/0046418 A1 2/2015 Akbacak et al.
2015/0049001 A1 2/2015 Rahman et al.
2015/0049201 A1 2/2015 Liu et al.
2015/0060506 A1 3/2015 Cameron et al.
2015/0061589 A1 3/2015 Wodrich et al.
2015/0070596 A1 3/2015 Gadjali
2015/0168729 A1 6/2015 Kobayashi
2015/0180286 A1 6/2015 Asanuma et al.
2015/0193980 A1 7/2015 Pedley
2015/0204949 A1 7/2015 Von Novak, III
2015/0236521 A1 8/2015 Park et al.
2015/0244204 A1 8/2015 Lee et al.
2015/0244341 A1 8/2015 Ritter et al.
2015/0244427 A1 8/2015 Kim et al.
2015/0244910 A1 8/2015 Marston et al.
2015/0249361 A1 9/2015 Kim et al.
2015/0249916 A1 9/2015 Schlub et al.
2015/0256021 A1 9/2015 Kwon et al.
2016/0026156 A1 1/2016 Jackson et al.
2016/0037025 A1 2/2016 Blum
2016/0072296 A1 3/2016 Nejatali et al.
2015/0103304 A1 4/2016 Darcy
2016/0172870 A1 6/2016 Blum et al.
2016/0182826 A1 6/2016 Blum et al.
2016/0190859 A1 6/2016 Blum et al.
2016/0203359 A1 7/2016 von und zu Liechtenstein
2016/0206056 A1 7/2016 Pluemer et al.
2016/0261147 A1 9/2016 Blum et al.
2016/0294225 A1 10/2016 Blum et al.
2016/0349533 A1 12/2016 Grassi
2016/0363787 A1 12/2016 Blum et al.
2017/0069192 A1 3/2017 Sood et al.
2017/0127196 A1 5/2017 Blum et al.
2017/0150049 A1 5/2017 Blum et al.
2017/0195529 A1 7/2017 Blum
2017/0223236 A1 8/2017 Oberlander et al.
2017/0272640 A1 9/2017 Fuller et al.

FOREIGN PATENT DOCUMENTS

CN 202033546 U 11/2011
CN 202407553 9/2012
CN 202419070 9/2012
CN 202424276 9/2012
CN 202424277 9/2012
CN 202424279 9/2012
CN 202424807 9/2012
CN 102777487 11/2012
CN 202635909 1/2013
CN 202635910 1/2013
CN 202635911 1/2013
CN 202636015 1/2013
CN 202647093 1/2013
CN 202647094 1/2013
CN 202647101 1/2013
CN 202647104 1/2013
CN 202647111 1/2013
CN 202649874 1/2013
CN 202649875 1/2013
CN 202651825 1/2013
CN 202652281 1/2013
CN 202652282 1/2013
CN 202652304 1/2013
CN 202652305 1/2013
CN 202800463 3/2013
CN 202800547 3/2013
CN 202811809 3/2013
CN 202818399 3/2013
CN 202904151 U 4/2013
CN 203178585 9/2013
DE 202009015991 4/2010
EP 0736268 10/1996
ES 2165795 3/2002
JP 07099596 A 4/1995
JP 2000138858 A 5/2000
KR 20140091195 A 7/2014
KR 101646541 8/2016
TW M300818 U 11/2006
TW M395176 U 12/2010
TW 201145748 A1 12/2011
WO 9208157 A1 5/1992
WO 0106298 A1 1/2001
WO 02/45044 A1 6/2002

(56) References Cited

FOREIGN PATENT DOCUMENTS

| | | | |
|---|---|---|---|
| WO | 2009/052705 | A1 | 4/2009 |
| WO | 2011041733 | A1 | 4/2011 |
| WO | 2012/039738 | A1 | 3/2012 |
| WO | 2012/093986 | A1 | 7/2012 |
| WO | 2013118162 | A1 | 8/2013 |
| WO | 2013/188343 | A1 | 12/2013 |
| WO | 2014/012536 | A1 | 1/2014 |
| WO | 2014012451 | A1 | 1/2014 |
| WO | 2014/102536 | A1 | 7/2014 |
| WO | 2014122538 | A2 | 8/2014 |
| WO | 2016022499 | A1 | 2/2016 |
| WO | 2016141349 | A1 | 9/2016 |
| WO | 2016205373 | A1 | 12/2016 |

OTHER PUBLICATIONS

Design U.S. Appl. No. 29/556,571, entitled "Eyewear Temple", filed Mar. 1, 2016 (no copy provided in accordance with the 1287 O.G. 163 waiver published Oct. 19, 2004); pp. all.

U.S. Appl. No. 15/179,018, entitled "Eyewear With Magnetic Track for Electronic Wearable Device", filed Jun. 10, 2016 (no copy provided in accordance with the 1287 O.G. 163 waiver published Oct. 19, 2004); pp. all.

U.S. Appl. No. 15/183,368, entitled "Wireless Power Systems and Methods Suitable for Charging Wearable Electronic Devices", filed Jun. 15, 2016 (no copy provided in accordance with the 1287 O.G. 163 waiver published Oct. 19, 2004); pp. all.

Blum, Ronald D. et al., U.S. Appl. No. 15/337,796, entitled "Hearing Aid Adapted for Wireless Power Reception", filed Oct. 28, 2016, pp. all.

"Make Your Watch Smart!", http://www.ct-band.com/en/; captured Nov. 10, 2016, pp. all.

"Sleepsport Band", http://www.officesupplynow.com/xcart/GRFGB40139-Griffin-Case-sleepsport-Band-bk.html?gclid=CjwKEAjwnebABRCjpvr13dHL8DsSJABB-ILJBcOqYMmKeCs3g_rcvbST3HVWtuup_HzVQ3-Iv5YFOBoCcK_w_wcB; captured Nov. 10, 2016, pp. all.

Kairos, , "Kairos T-Band Only", https://kairoswatches.com/tbands/tband/; captured Nov. 10, 2016, pp. all.

"Glance: World's First Smart Accessory for Your Watch", https://www.kickstarter.com/projects/1742184757/glance-worlds-first-smart-accessory-for-your-watch; captured Nov. 10, 2016, pp. all.

"Fitbit Pouch for Watch Strap", https://www.etsy.com/listing/186507712/fitbit-pouch-for-watch-strap; captured Nov. 10, 2016, pp. all.

"Classi: The World's First Leather Smart Strap for Classic Watches", http://www.maintool.me/classi.html; captured Nov. 10, 2016, pp. all.

"Marathon Watch Band Clip Compass", http://www.chronoworld.com/marathon-watch-band-clip-compass- co194004.html; captured Nov. 10, 2016, pp. all.

"Modillion Turns Any "Dumb" Watch Into a Smart Watch", http://newatlas.com/modillian-smartwatch-strap/32059/; captured Nov. 10, 2016, pp. all.

"Wearable Technology Meets the Art of Fine Watchmaking", http://www.montblanc.com/en-us/discover/specials/montblanc-intro-duces-e-strap.html; captured Nov. 10, 2016, pp. all.

"Multi Functional Pouch Armband Ankel Band Wristband for Fitbit Flex Fitbit One Clip . . .", https://www.amazon.com/functional-armband-wristband-smartband-withings/dp/B00WALZXCW; captured Nov. 10, 2016, pp. all.

"Review of 1BANDID Sports & GPS Watch ID Bands", https://www.dcrainmaker.com/2011/09/review-of-1bandid-sports-gps-watch-id.html; captured Nov. 10, 2016, pp. all.

"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.

"Skyview Pinnacle", https://www.nicogerard.com/nico-gerard-skyview-pinnacle; captured Nov. 10, 2016, pp. all.

"Custom Watchband Holder for Fitbit Flex", http://wmw.shapeways.com/product/YWXHN5VYP/custom-watchband-holder-for-fitbit-flex?optionId=17995763; captured Nov. 10, 2016, pp. all.

""Unique" Hand-Made Strap Discretely Adds Smart Features to Any Watch", http://newatlas.com/unique-smartwatch-strap/39458/; captured Nov. 10, 2016, pp. all.

"Transform Your Wristwatch Into a Smart Device", http://www.wotch.de/; captured Nov. 10, 2016, pp. all.

U.S. Appl. No. 15/337,796, entitled "Hearing Aid Adapted for Wireless Power Reception", filed Oct. 28, 2016, pp. all.

U.S. Appl. No. 29/588,270, entitled "Eyewear Temple", filed Dec. 19, 2016, pp. all.

U.S. Appl. No. 15/672,971 entitled "Connectors for Attaching One or More Wearable Devices to Eyewear", filed Aug. 9, 2017, pp. all.

U.S. Appl. No. 15/627,759, filed Jun. 20, 2017 entitled "Image Alignment Systems and Methods", pp. all.

International Search Report and Written Opinion received for PCT/US2015/043490 dated Nov. 17, 2015.

"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, pp. 1-16.

"Alpha—The Worlds Smallest 4K Action Camera", https://wvvw.indiegogo.com/projects/alpha-the-world-s-smallest-4k-action-camera-sports; captured Oct. 9, 2017, pp. all.

* cited by examiner 2000
2012
2010
10

2000
2010
10

2000
2010
2012
10
21
20

2000
10
2012

WEARABLE CAMERA SYSTEMS AND APPARATUS AND METHOD FOR ATTACHING CAMERA SYSTEMS OR OTHER ELECTRONIC DEVICES TO WEARABLE ARTICLES

CROSS-REFERENCE TO RELATED APPLICATIONS

This application claims the benefit under 35 U.S.C. 119 of the earlier filing date of U.S. Provisional Application 62/032,589 entitled "EYEWEAR WITH CAMERA SYSTEM AND ATTACHMENT MECHANISM", filed Aug. 3, 2014. The aforementioned provisional application is hereby incorporated by reference in its entirety, for any purpose.

This application also claims the benefit under 35 U.S.C. 119 of the earlier filing date of U.S. Provisional Application 62/045,246 entitled "MULTI-USE ATTACHABLE EYEGLASS CAMERA", filed Sep. 3, 2014. The aforementioned provisional application is hereby incorporated by reference in its entirety, for any purpose.

This application also claims the benefit under 35 U.S.C. 119 of the earlier filing date of U.S. Provisional Application 62/086,747 entitled "CAMERA SYSTEM FOR EYEWEAR", filed Dec. 3, 2014. The aforementioned provisional application is hereby incorporated by reference in its entirety, for any purpose.

This application also claims the benefit under 35 U.S.C. 119 of the earlier filing date of U.S. Provisional Application 62/091,697 entitled "EYEWEAR SYSTEM FOR CAMERA", filed Dec. 15, 2014. The aforementioned provisional application is hereby incorporated by reference in its entirety, for any purpose.

This application also claims the benefit under 35 U.S.C. 119 of the earlier filing date of U.S. Provisional Application 62/153,999 entitled "CAMERA SYSTEM CAPABLE OF WIRELESS ENERGY TRANSFER", filed Apr. 28, 2015. The aforementioned provisional application is hereby incorporated by reference in its entirety, for any purpose.

This application also claims the benefit under 35 U.S.C. 119 of the earlier filing date of U.S. Provisional Application 62/048,820 entitled "EYEWEAR WITH TEMPLE TRACK", filed Sep. 11, 2014. The aforementioned provisional application is hereby incorporated by reference in its entirety, for any purpose.

This application also claims the benefit under 35 U.S.C. 119 of the earlier filing date of U.S. Provisional Application 62/052,910 entitled "FASHIONABLE EYEWEAR COMPRISING A TRACK", filed Sep. 19, 2014. The aforementioned provisional application is hereby incorporated by reference in its entirety, for any purpose.

This application also claims the benefit under 35 U.S.C. 119 of the earlier filing date of U.S. Provisional Application 62/053,275 entitled "EYEWEAR COMPRISING A TRACK", filed Sep. 22, 2014. The aforementioned provisional application is hereby incorporated by reference in its entirety, for any purpose.

This application also claims the benefit under 35 U.S.C. 119 of the earlier filing date of U.S. Provisional Application 62/140,276 entitled "OPTIMIZED EYEWEAR TRACK AND ATTACHMENT MEANS FOR ELECTRONIC DEVICE," filed Mar. 30, 2015. The aforementioned provisional application is hereby incorporated by reference in its entirety, for any purpose.

This application also claims the benefit under 35 U.S.C. 119 of the earlier filing date of U.S. Provisional Application 62/154,007 entitled "EYEWEAR TRACK, WIRELESS ENERGY TRANSFER SYSTEM AND ATTACHMENT MEANS FOR ELECTRONIC DEVICE," filed Apr. 28, 2015. The aforementioned provisional application is hereby incorporated by reference in its entirety, for any purpose.

This application also claims the benefit under 35 U.S.C. 119 of the earlier filing date of U.S. Provisional Application 62/080,437 entitled "EYEWEAR WITH GUIDE FOR WEARABLE DEVICES", filed Nov. 17, 2014. The aforementioned provisional application is hereby incorporated by reference in its entirety, for any purpose.

TECHNICAL FIELD

The present disclosure relates to wearable electronic devices, for example wearable camera systems, and more particularly to apparatuses and methods for attaching electronic devices such as camera systems to eyewear or other wearable articles.

BACKGROUND

The world is quickly becoming a world of instant or near instant information availability. Certain of this information are photographs and videos. In addition, intelligent wireless devices and apps allow for the transfer of this information quickly, seamlessly and effortlessly. It is estimated that over one trillion digital photos will be taken in 2015 with the vast majority being taken by mobile phone cameras. Further, there are now over 6 billion mobile phones owned and actively used in the world or which approximately 4 billion have cameras associated.

There are 2 Billion individuals in the world who wear prescription eyeglasses and over an estimated 300 Million pairs of eyeglasses sold in the world each year. Conventional eyeglasses may not include a camera, mainly because eyeglasses/eyewear are perceived to be a fashion item by the consumer. Attaching a conventional camera to eyewear by any conventional techniques may distract from the cosmetics or fashion-look of the eyeglasses or eyewear. Examples in the present disclosure may address some of the shortcomings in this field.

SUMMARY

Wearable electronic device systems, for example wearable camera systems, and apparatuses and methods for attaching electronic devices such as cameras to eyewear or other wearable articles are described.

An electronic device system according to some examples of the present disclosure may include an eyewear frame including a temple and a first guide integral with the temple, the temple having a finished surface, and the first guide extending between a first location on the temple and a second location on the temple. The first guide may be formed on a side of the temple and extend partially through a thickness of the temple or protrude from the temple, the first guide comprising a base and at least one sidewall adjacent to the base, the finished surface of the temple including surfaces of the base and the at least one sidewall. The system may further include an electronic device movably coupled to the temple, the electronic device comprising a second guide coupled to the first guide, and an attachment system securing the electronic device to the temple, whereby the electronic device is movable along the guide while remaining secured to the temple. In some examples, the first guide may include a rail or a groove.

An electronic device system according to further examples of the present disclosure may include an eyewear frame including a temple and a first securing guide integral with the temple, the temple having a finished surface and the first securing guide extending between a first location on the temple and a second location on the temple. The first securing guide may be formed on a side of the temple and may extend partially through a thickness of the temple or may protrude from the temple. The first securing guide may include a base and at least one sidewall adjacent to the base, the finished surface of the temple including surfaces of the base and the at least one sidewall. The first and second securing guides may be configured to maintain the electronic device on the temple as the electronic device is moved along the first guide. In some examples, the first securing guide may include a rail or a groove.

BRIEF DESCRIPTION OF THE DRAWINGS

The above objectives, features, aspects and attendant advantages of the present invention will become apparent from the following detailed description of various embodiments, including the best mode presently contemplated of practicing the invention, when taken in conjunction with the accompanying drawings, in which.

DETAILED DESCRIPTION

An electronic device system according to some examples of the present disclosure may include an eyewear frame including a temple and a first guide integral with the temple, the temple having a finished surface, and the first guide extending between a first location on the temple and a second location on the temple. The first guide may be formed on a side of the temple and extend partially through a thickness of the temple or protrude from the temple, the first guide comprising a base and at least one sidewall adjacent to the base, the finished surface of the temple including surfaces of the base and the at least one sidewall. The system may further include an electronic device movably coupled to the temple, the electronic device comprising a second guide coupled to the first guide. In some examples, the first guide may include a rail or a groove. In some examples, the first and second securing guides may be configured to maintain the electronic device on the temple as the electronic device is moved along the first guide. In some examples, the system may include an attachment system securing the electronic device to the temple, whereby the electronic device is movable along the guide while remaining secured to the temple.

Figure 1:
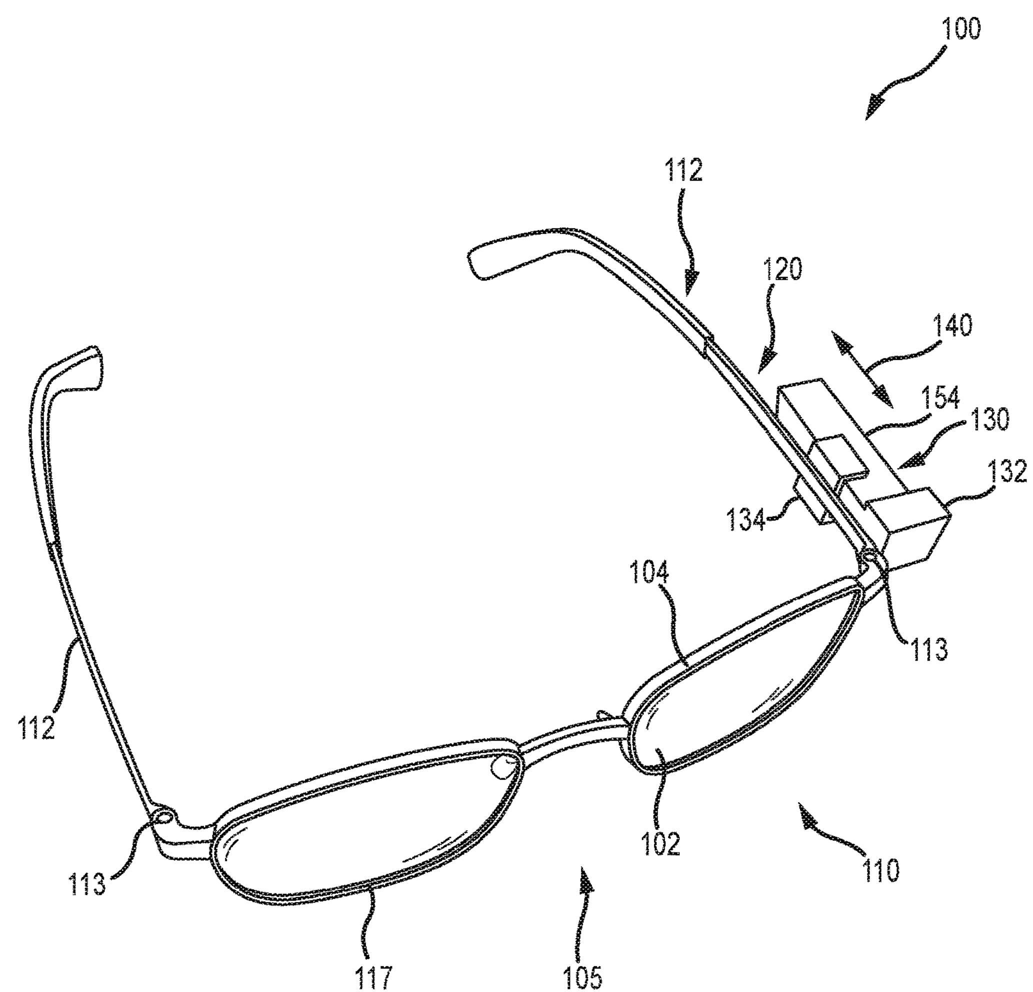
FIG. 1 is a view of a system including a securing guide according to some examples of the present disclosure.
Figure 2:
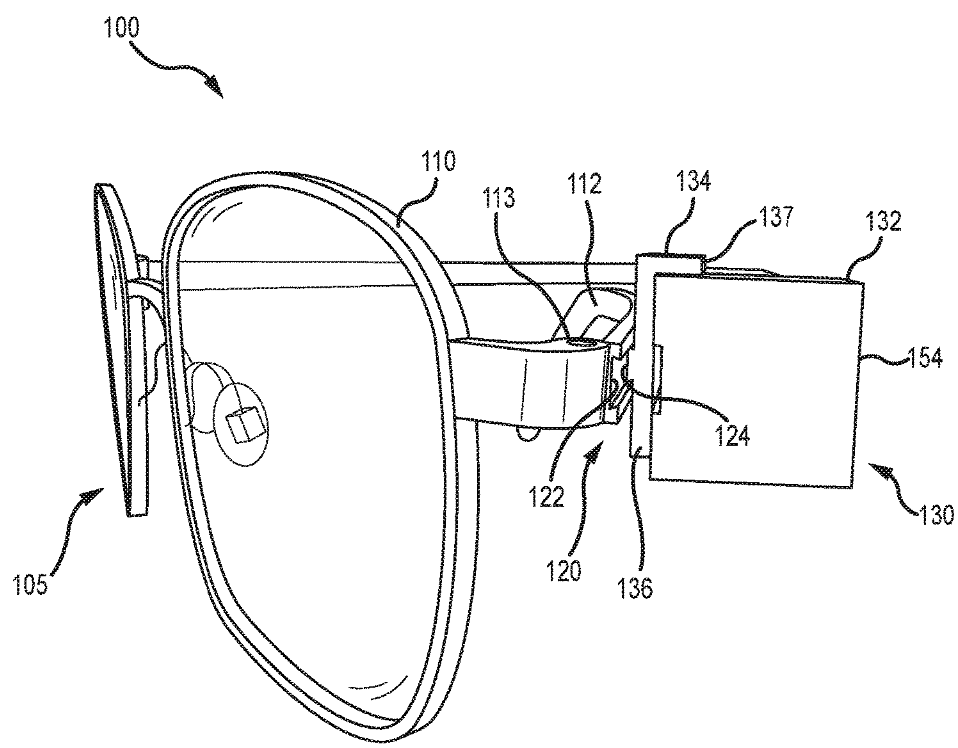
FIG. 2 is another view of the system in FIG. 1.
Figure 3:
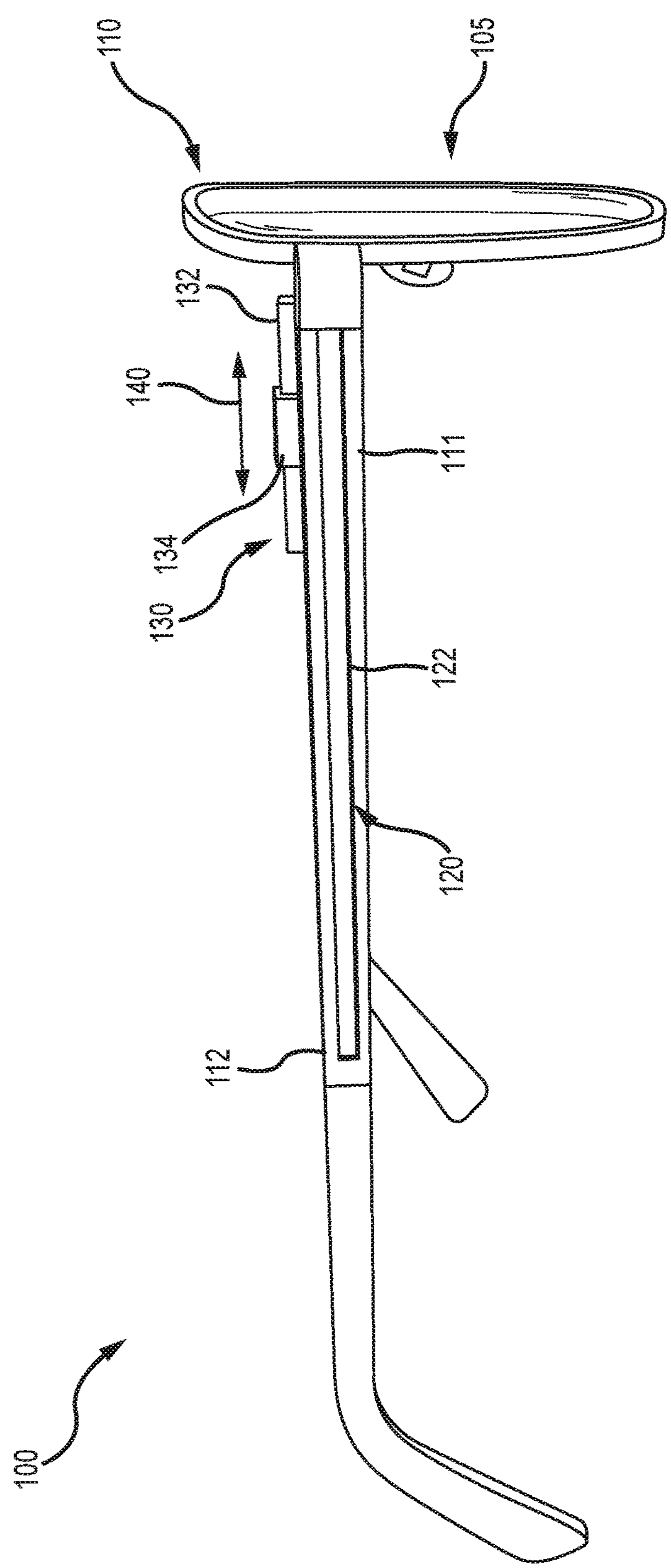
FIG. 3 is yet another view of the system in FIG. 1.

FIGS. 1-3 are views of a wearable camera system 100 according to some examples of the present disclosure. The system 100 includes eyewear 105 and electronic device 130 attached thereto. The eyewear 105 includes an eyewear frame 110 which includes a temple 112. Typically, an eyewear frame 110 includes a pair of temples 112 (e.g., left and right temples), one for each side of a wearer's head. In some examples, the temples 112 are pivotably coupled to a lens portion 117 of the frame via a hinge 113. The lens portion may include a pair of lenses 102, for example and without limitation prescription lenses, non-prescription lenses, tinted lenses, changeable tint lenses, variable focus lenses, switchable focus lenses, or any combinations thereof. The lens portion may include a rim 104, as in the example in FIGS. 1-3, or the lens portion may be rimless in other embodiments.

One or both of the temples 112 of eyewear frame 110 may include a guide 120 for coupling an electronic device 130 to the temple of eyewear frame 110. The guide 120 may be part of an attachment system including a first guide and a second guide configured for slidable engagement with one another. In this regard, the guide 120 may be a first guide configured for slidable engagement with a second guide on the electronic device 130. The first guide (e.g., guide 120) may include a rail or a groove, which may be implemented according to any of the examples herein, and the second guide on the electronic device may include a groove or a rail configured for cooperating fit with the rail or groove of the first guide 120. The electronic device 130 may be a miniaturized self-contained electronic system such as a camera system or simply camera 132. The electronic device 130 may be virtually any miniaturized electronic device, for example and without limitation a camera, image capture device, IR camera, still camera, video camera, image sensor, repeater, resonator, sensor, hearing aid, sound amplifier, directional microphone, eyewear supporting an electronic component, spectrometer, directional microphone, microphone, camera system, infrared vision system, night vision aid, night light, illumination system, sensor, pedometer, wireless cell phone, mobile phone, wireless communication system, projector, laser, holographic device, holographic system, display, radio, GPS, data storage, memory storage, power source, speaker, fall detector, alertness monitor, geo-location, pulse detection, gaming, eye tracking, pupil monitoring, alarm, CO sensor, CO detector, $CO_2$ sensor, $CO_2$ detector, air particulate sensor, air particulate meter, UV sensor, UV meter, IR sensor, IR meter, thermal sensor, thermal meter, poor air sensor, poor air monitor, bad breath sensor, bad breath monitor, alcohol sensor, alcohol monitor, motion sensor, motion monitor, thermometer, smoke sensor, smoke detector, pill reminder, audio playback device, audio recorder, speaker, acoustic amplification device, acoustic canceling device, hearing aid, video playback device, video recorder device, image sensor, fall detector, alertness sensor, alertness monitor, health sensor, health monitor, fitness sensor, fitness monitor, physiology sensor, physiology monitor, mood sensor, mood monitor, stress monitor, pedometer, motion detector, geo-location, pulse detection, wireless communication device, gaming device, eye tracking device, pupil sensor, pupil monitor, automated reminder, light, alarm, cell phone device, phone, mobile communication device, poor air quality alert device, sleep detector, dizziness detector, alcohol detector, thermometer, refractive error measurement device, wave front measurement device, aberrometer, GPS system, smoke detector, pill reminder, speaker, kinetic energy source, microphone, projector, virtual keyboard, face recognition device, voice recognition device, sound recognition system, radioactive detector, radiation detector, radon detector, moisture detector, humidity detector, atmospheric pressure indicator, loudness indicator, noise indicator, acoustic sensor, range finder, laser system, topography sensor, motor, micro motor, nano motor, switch, battery, dynamo, thermal power source, fuel cell, solar cell, kinetic energy source, thermo electric power source.

The guide 120 may be provided on any side of temple 112, for example an outside side 111, on a top and/or bottom sides (e.g., as in FIGS. 5A and 5B), or any combinations thereof. The guide 120 may be configured to guide a movement of the electronic device 130 (e.g., camera 132) along a predetermined direction, e.g., as indicated by arrow 140. For example, the guide 120 may constrain one or more degrees of freedom of the electronic device 130 when the electronic device 130 is coupled to the temple 112. As such, movement of the electronic device 130 may be confined to one or more predetermined directions. In some examples, the guide 120 may be configured to guide movement of the electronic device 130 substantially along a longitudinal direction 140 of the temple. The longitudinal direction, also referred to herein as length-wise direction, may be a direction oriented substantially along a length of the temple 112. The guide may begin at the front of the temple and extend to the back of the temple. The guide may begin at the front one half of the temple and extend to the back one half of the temple. The guide may begin at the front one third of the temple and extend to the back one third of the temple. The guide may start at the front of the temple and extend to the back one half of the temple. An electronic device can be loaded on the guide at a point between the front of the guide and the back of the guide. An electronic device can be loaded on the guide at the front of the guide. An electronic device can be loaded on the guide at the back of the guide. An electronic device can be loaded on the guide at the front of the temple. An electronic device can be located on the guide at the back of the temple.

Guides according to the present disclosure may be configured as securing guides or non-securing guides. A securing guide may be configured to guide movement of the electronic device (e.g. camera 132) along a predetermined direction (e.g., longitudinal direction 140) and to maintain the electronic device (e.g. camera 132) in position (e.g., in engagement with the temple 112). For example, a securing guide may include features configured to maintain the electronic device (e.g. camera 132) in engagement with the guide 120. In some examples, a securing guide may be configured to constrain five (all three rotational and two of the three translational) of the six degrees of freedom of the camera 132 leaving one degree of freedom (translation in a predetermined direction, for example the longitudinal direction 140) unconstrained.

A non-securing guide may be configured to guide movement of the electronic device 130 along a predetermined direction while also allowing movement of the electronic device 130 along other direction including a direction which may cause the device to disengage from the guide 120. That is, a non-securing guide may only constrain one or more degrees of freedom as appropriate to guide the electronic device 130 along a path corresponding to the predetermined direction of movement. In such examples, a securing mechanism may be included to maintain the electronic device 130 in engagement with the guide 120. In some examples, securing mechanism may comprise one or more bands, as will be further described below, e.g., with reference to FIG. 4. An example of a band, without limitation, may be an adjustable strap, an elastic ring such as an O-ring, a stretchable slide member, or combinations thereof. In some examples, an attachment system for attaching an electronic device to eyewear may include a plurality of band configured for coupling the electronic device to temples that have different sizes and/or geometries. For example, the plurality of bands may comprise a plurality of elastic rings (e.g., O-rings) having different diameters. In some examples, the securing mechanism may comprise magnetic means. For example, the temple may include a metallic material (e.g., a metallic member) which may be attached to or embedded within the temple for magnetically coupling to a magnet on the electronic device as will be further described, e.g., with reference to FIGS. 11A and 11B as well as FIGS. 12A and 12B.

In the example in FIGS. 1-3, guide 120 comprises a female groove 122 which is configured to receive a male rail 124 of a second guide at least partially therein. The male rail 124 may be provided on an electronic device and may be shaped for a cooperating fit with the female groove 122. For example, the male rail 124 may include a protrusion which is sized and shaped for insertion into a groove of the female groove 122. In the example in FIGS. 1-3, guide 120 is configured as a securing guide. The female groove 122 comprises a cross-sectional shape selected to prevent the male rail 124 from disengaging from the female groove 122. In this example, the female groove 122 has a generally trapezoidal cross-section and the male rail 124 has an inverted generally trapezoidal cross-section which is shaped and sized to fit within the female groove 122. The female groove 122 having a generally trapezoidal cross-section implies that a width of the female groove 122 at the top of the groove is smaller than a width of the female groove 122 at the base of the groove 122 thereby preventing movement of the male rail 124 in a direction generally perpendicular to the groove. The geometry of the slidable joint defined by the groove and rail in the example in FIG. 2 may also be referred to as a dovetail geometry. As such, the slidable joint may also be said to have a dove-tail cross-sectional shape. In the present disclosure, groove may be interchangeably used with female groove and rail may be interchangeably used with male rail.

As further illustrated in FIG. 1-3, the electronic device (e.g. camera 132) may be coupled to temple 112 using an intermediate component, e.g., a shoe 134. The shoe may be formed of a rigid material, such as a rigid plastic material, and may include the second guide. The shoe may be configured to slidably engage with the first guide 120 via the second guide. For example, if guide 120 comprises a female groove 122 as in the present example, the shoe may include a male rail 124. In other example, the shoe may include a female groove and the temple 112 may include a male rail configured for insertion into the female groove of the shoe 134. In some example, the shoe 134 may be removably coupled to the electronic device 130 (e.g., camera 132). In some examples, the shoe may have a geometry configured to at least partially wrap around the camera 132. In some examples, the shoe may have a generally C-shaped cross section. In further example, the shoe may have a generally I-shaped cross section, e.g., as in the example in FIGS. 5A and 5B described further below.

The shoe 134 may include a generally planar body 136 and generally perpendicular extensions (only one of the extensions in the pair, extension 137, is visible in FIG. 2) disposed on opposite ends of the body 136. The extensions may be configured to engage with opposite sides of the electronic device 130 (e.g., camera 132), for example top and bottom sides. In some examples, the shoe 134 may engage with forward and aft sides of the electronic device 130 (e.g., camera 132). Each of the extensions in the pair may be configured to snap into engagement with a housing 154 of the camera 132. For example, the extensions 137 may include attachment features which may be received into surface features of the housing 154. The shoe 134 may have a length, which may be substantially the same as a length of the camera (e.g., as in FIG. 16B) or shorter than a length of the camera (e.g., as in FIGS. 1-3). The length may be selected such that the shoe 134 firmly engages with the camera 132 when coupled thereto. In some examples, the length of the shoe 134 may be between about one half and one quarter of the length of the camera 132. In some examples, the length of the shoe may be about one third of the length of the camera 132.

As described herein, a guide may extend along a temple between a first location on the temple and a second location on the temple. In some examples, the first guide may be formed on an outside side of the temple, e.g., as illustrated in the examples in FIGS. 1-4. The first location on the temple may be a location at a forward end of the temple and the second location on the temple may be a location near an aft end of the temple. For example, the second location may be a location which is a distance of about ⅓ of the length of the temple forward of the aft end of the temple. In some examples, the guide may extend a certain percentage of the length of the temple, for example the guide may extend about 50%, about 60%, about 70%, or about 80% of the length of the temple or anywhere between about 40% to about 90% of the length of the temple.

In some examples, the guide extends sufficiently far along the temple such that an electronic device can be moved to a location nearest the ear where a width of the electronic device is greater than a distance between the inside of the temple and the wearer's head. For example, the electronic device may be positioned at least partially above, below, or outside the temple such that it may be moved along the guide toward the wearer's ear far enough back that it reaches a place where the width of the electronic device would have caused it to hit the wearer's face if it were positioned inside the temple. The guide may be inside the temple, outside the temple, on the top or bottom of the temple, or combinations thereof.

Figure 4:
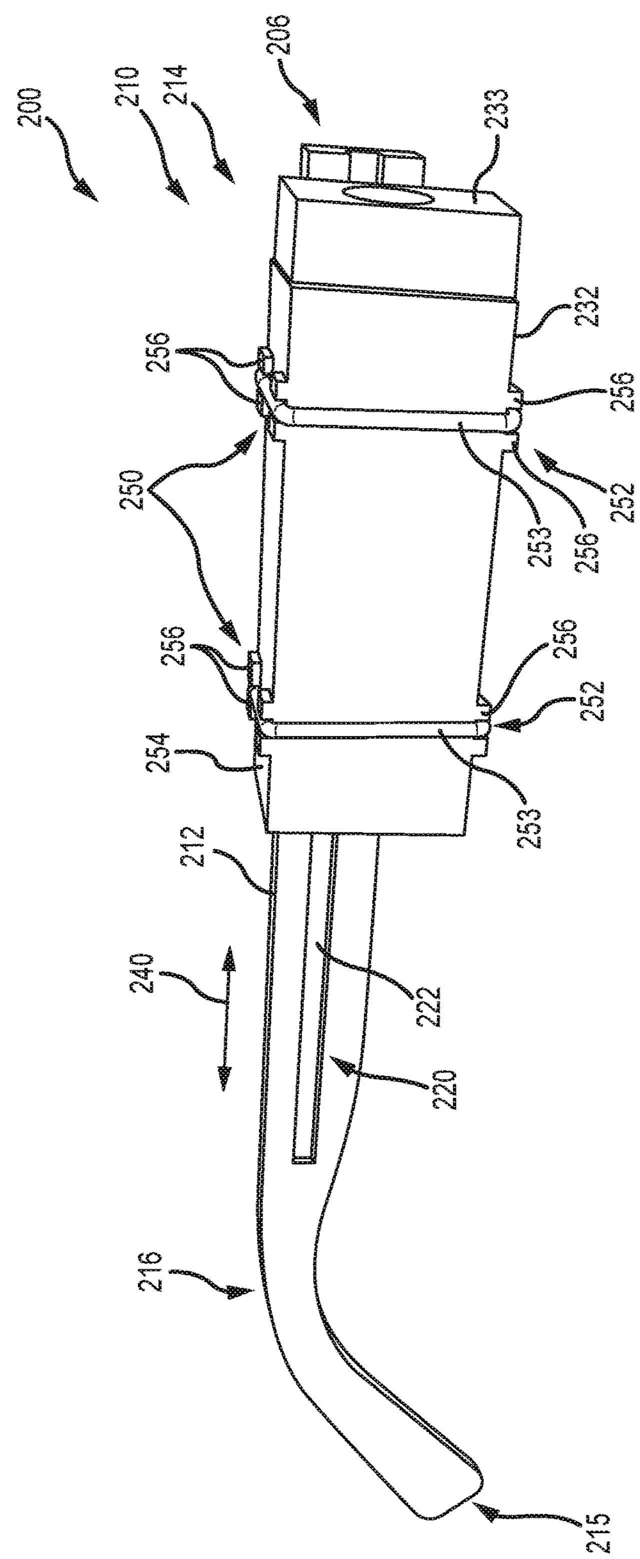
FIG. 4 is a partial view of a system including a non-securing guide according to some examples of the present disclosure.

FIG. 4 is a partial view of a system 200 comprising a temple 212 of an eyewear frame 210 (only partially shown in FIG. 4). In some examples, the system may also include a camera 232 according slidably engaged with the temple 212. The camera 232 is slidably engaged with the temple 212 via guide 220 such that the camera 232 is movable along the temple 212. For example, the camera 232 may be movable between a first position and a second position along a length of the temple 212. The first position may be a forward position and the second position may be an aft position. When the camera 232 is in the first position, a forward end 233 of the camera 232 may be at substantially at, slightly forward of, or slightly aft of a forward end 206 of the temple 212. The aft position may be a position selected to substantially conceal the camera 232 from view (e.g., behind an ear of a person wearing the eyewear frame 210).

In the example in FIG. 4, the guide 220 is configured to guide movement of the camera 232 along a length-wise direction 240 of temple 212. In this regard, the guide 220 extends along at least part of the length of temple 212. In some examples, the temple includes a first portion 214 and a second portion 216. The first portion 214 (e.g., forward portion 214) of temple 212 may extend from the forward end 206 of the temple 212 to a location where the temple 212 curves downward, e.g., for engagement with the wearer's head and more specifically for placement behind the wearer's ears. The second portion 216 (e.g., aft portion 216) of temple 212 may extend from the location where the temple curves downward to the aft end 215 of the temple. In some examples, the guide may extend along at least part of the length of temple 212, for example the length of the first portion. In some examples, the guide may extend partially along the length of the first portion or beyond the first portion. The guide 220 may be a first guide which is configured to engage with a second guide on the camera 232.

As previously described, guides according to the present disclosure may be securing guides or non-securing guides. A securing guide holds an electronic device in place as the device is moved along the guide. A non-securing guide may not hold an electronic device in place as it is moved along the guide. A securing mechanism may be used with a non-securing guide in order to secure an electronic device to the non-securing guide as it moves along the guide. In some examples, the guide may include a non-securing female groove (e.g., as in the example in FIG. 4), a securing female groove (e.g., as in the previous example in FIGS. 1-3), a non-securing male rail, or a securing male rail as will be further described. As will be understood, guides according to the present disclosure may include one or more rails or one or more tracks disposed or coupled to one or more sides of a temple and/or disposed or coupled to an electronic device. The specific examples of guides described herein, for example with reference to FIGS. 9-12, are illustrative only. Any of the rails and/or tracks according to the present disclosure may interchangeably be provided on either the temple or the electronic device. Temples and attachment systems for electronic devices to eyewear may include guides with one or more of any of the rail(s), groove(s), and features thereof described herein in any combination.

In the example in FIG. 4 the guide 220 is implemented as a non-securing guide, in that the guide 220 guides movement of the camera 232 but does not otherwise secure the camera 232 to the eyewear. By securing, it is implied that the camera is coupled to the eyewear such that it remains in engagement with the guide 220, e.g., in engagement with the rail or groove provided on the temple. The guide 220 in FIG. 4 includes a non-securing female groove configured to receive a male rail (not shown). The male rail may be integrated into or coupled to the camera 232. For example, the male rail may be integrated into a housing 254 of camera 232. In further example, the male rail may be incorporated into an intermediate component (e.g., a shoe as illustrated in the example in FIGS. 1-3), and the intermediate component may be coupled to the camera 232.

Figures 21A, 21B, 21C:
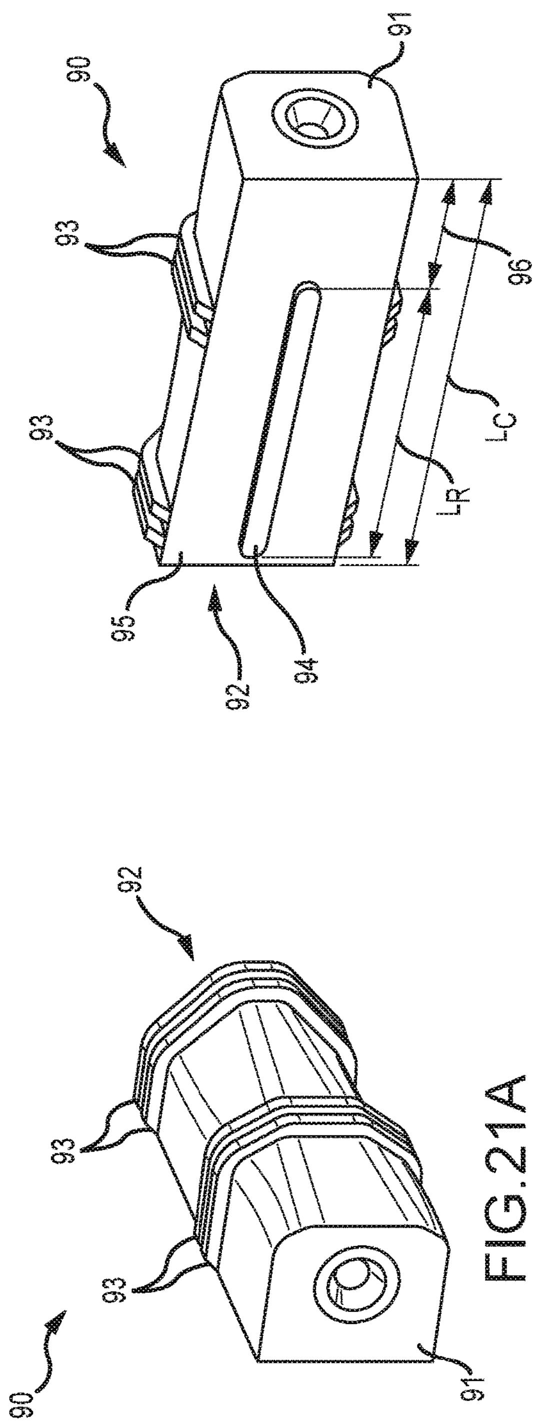
FIGS. 21A-21C are views of a camera according to further examples of the present disclosure.

In some examples, the system 200 may include a securing mechanism 250. In some examples, the securing mechanism may include one or more bands 252, which may be configured to engage with surface features 256 on a housing 254 of camera 232 to maintain the camera 232 in engagement with the guide 220. The bands 252 may be stretchable bands. For example, the bands 252 in FIG. 4 are implemented as elastic rings 253, which bias the camera 232 towards the temple 212 while allowing movement of the camera 232 along the length of the temple 212. A stretchable band may adapt to changes in the design, contour, thickness and width of the eyewear temple while securing the electronic device on a non-securing guide. In some examples, a securing mechanism may be used with a securing guide for added protection, e.g., for reducing a risk of the electronic device accidently becoming disengaged from the securing guide. The surface features 256 may include ribs (see also surface features 93 in FIGS. 21A-21C), which may extend from a surface of the housing 254. The elastic ring 253 may engage with the surface features 256, for example by being positioned between a pair of ribs to bias the camera 232 towards the temple 212. In some examples, the surface features 256 may include indentations in a surface of the housing 254. which may receive the elastic ring 253 therein. The surface features reduce the risk of the securing mechanism (e.g., stretchable band) sliding off the electronic device as the electronic device is moved along the guide. In this manner, the surface features may maintain the securing mechanism in attachment with the electronic device while the electronic device is moved along the guide. In other examples, the securing mechanism 250 may include magnetic means, e.g., as will be described with reference to FIGS. 12A-12C.

Figure 5B:
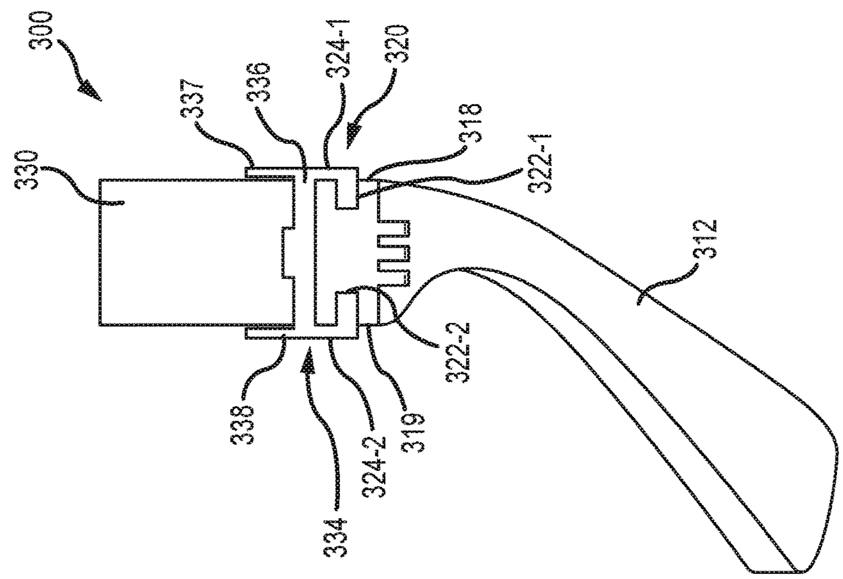
FIG. 5B is another partial view of the system in FIG. 5A.
Figure 5A:
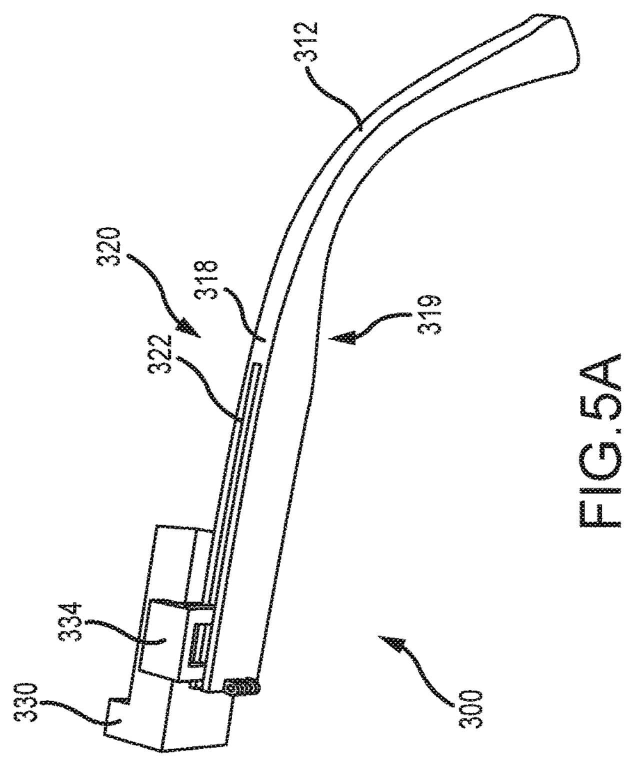
FIG. 5A is a partial view of a system including a securing guide according to further examples of the present disclosure.

Referring now to FIGS. 5A and 5B, attachment systems including first and second guides for attaching an electronic device to eyewear according to further examples will be described. FIGS. 5A and 5B show partial views of a system 300 according to the present disclosure. System 300 includes a temple 312 of an eyewear frame, the temple 312 comprising a first guide 320. Guide 320 is configured for slidable engagement with a second guide on an electronic device 330. In some examples, the electronic device may be a camera. The guide 320 in this example is implemented as a securing guide. The guide 320 comprises a pair of female tracks 322 disposed on opposite sides of temple 312. That is, guide 320 includes a first groove 322-1 (e.g., top groove 322-1) provided on a first side 318 (e.g., top side 318) of temple 312 and a second groove 322-2 (e.g., bottom groove 322-2) provided on a second side 319 (e.g., bottom side 319) of temple 312. The tracks 322-1, 322-2 comprise grooves having a generally U-shaped cross section, also referred to as closed grooves. In some examples, and without limitation, tracks according to the present disclosure may have other cross-sections such as an L-shaped cross section (also referred to as open groove), a generally C-shaped cross section (also referred to as hook groove), an inverted T-shaped cross section, a V-shaped cross section, or a dovetail cross section. A partially closed groove includes two opposing side walls extending from a base of the groove, the side walls having the same or dissimilar heights. An open groove includes only one side wall. A hook groove includes a side wall and a top wall adjacent to the side wall and opposite a base of the groove. A groove having an inverted T-shaped cross section includes partial top wall extending toward one another from opposing side walls of the groove, thereby defining a groove having a base which is wider than the top portion and/or opening of the groove. A groove with a V-shaped cross section includes a base which generally defines an angle between the sidewalls of the groove.

In this example, the electronic device 330 is coupled to the temple 312 using a an intermediate component such as a shoe 334. The shoe 334 is disposed between the electronic device 330 and the temple 312. The shoe 334 is configured for slidable engagement with guide 320 and is further configured for engagement with the electronic device 330. The shoe 334 is generally I-shaped in cross-section. That is, the shoe 334 includes a body 336 having a generally planar geometry. The shoe 334 further includes a guide comprising a pair of male rails 324-1, 324-2 extending from opposite ends of the body towards a first direction generally perpendicular to the body 336. Each of the male rails 324-1 and 324-2 is configured for insertion into respective ones of the female tracks 322 (e.g., first and second tracks 322-1, 322-2, respectively). The shoe 334 is further configured to be coupled to the electronic device 330, e.g., via the extensions 337 and 338 which extend from body 336 in a second direction opposite the first direction.

Figure 6:
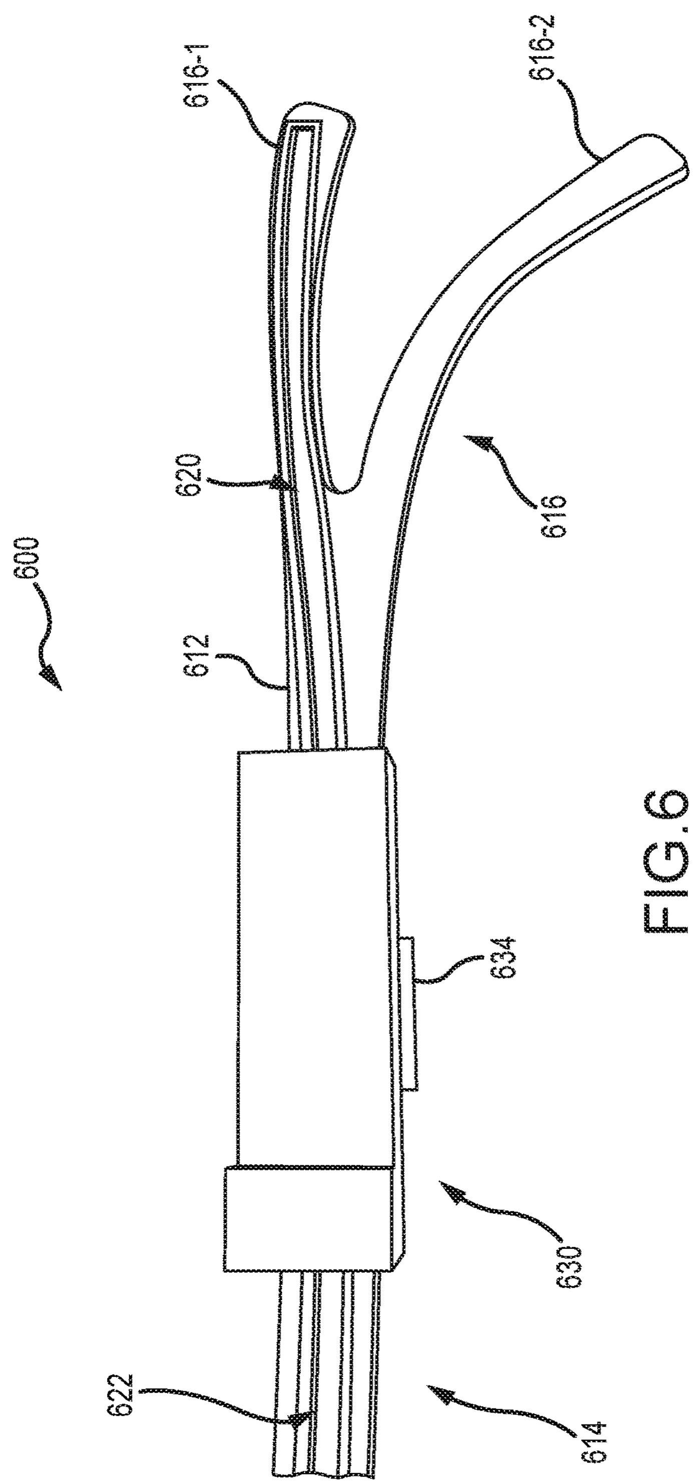
FIG. 6 is a side view of a bifurcated temple for eyewear according to some examples of the present disclosure.
Figure 7:
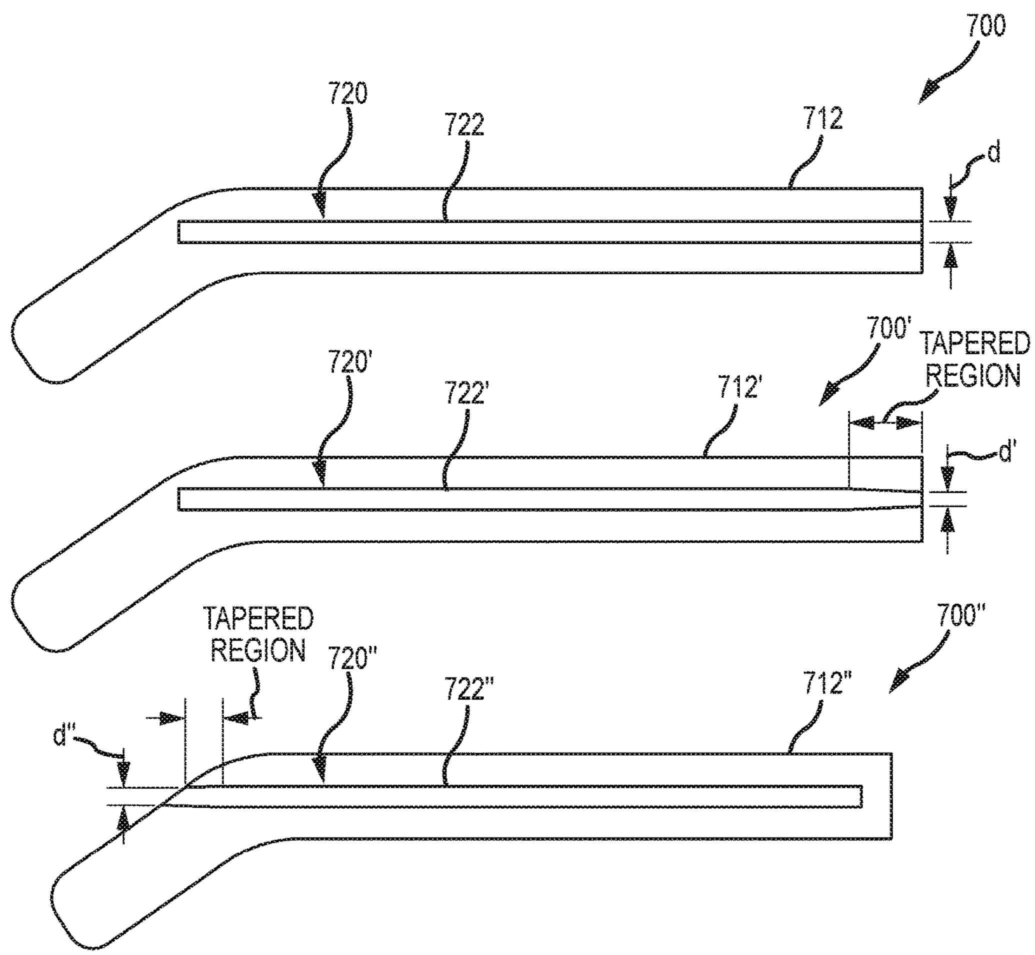
FIG. 7 are views of temples including guides according to examples of the present disclosure.
Figure 8:
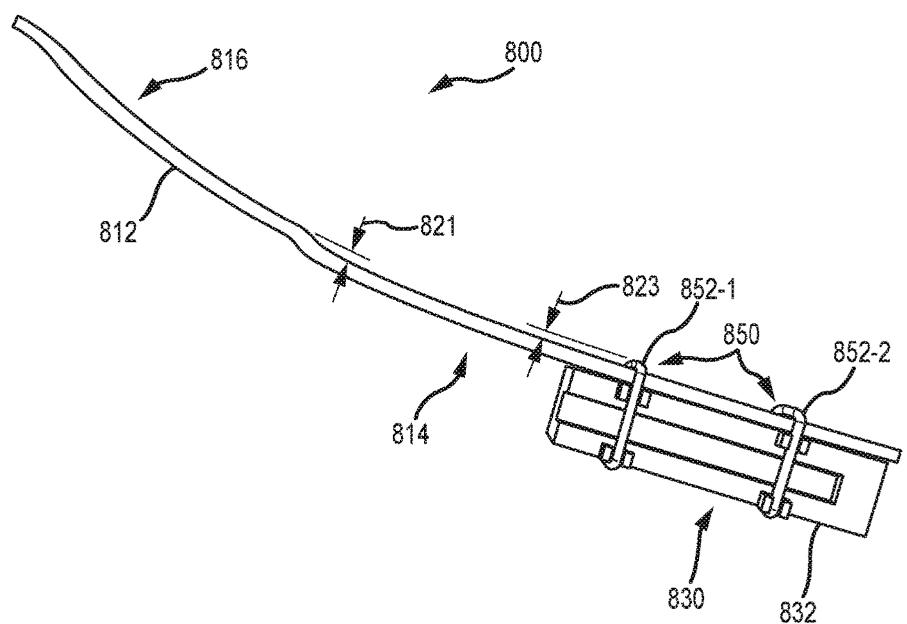
FIG. 8 is a view of a temple including an offset according to examples of the present disclosure.

Referring now to FIGS. 6-8 additional features of temples according to the present disclosure are described.

In some examples, it may be desirable to provide an extended guide, which may enable a user to slide the electronic device further aft, such as to better conceal the electronic device behind the user's ear, than may otherwise be possible without an extended guide. FIG. 6 illustrates a partial view of another system 600 including an electronic device 630 slidably engaged with a temple 612, in this case a bifurcated temple 612. The temple 612 includes a guide 620 which includes a groove 622. Although not specifically illustrated, it will be understood that the guide 620 may, in other examples, include a rail. In this example, the electronic device 630 is slidably coupled to a guide 620 using a shoe 634.

The temple 612 includes a forward portion 614 and an aft portion 616. The aft portion is forked into an aft upper portion 616-1 and aft lower portion 616-2. The aft upper portion 616-1 may be generally in line with the forward portion 614, while the aft lower portion 616-2 may be curve downward, thus also referred to as curved portion 616-2. The guide 620 extends along the forward portion 614 and the aft upper portion 616-1 of temple 612. The guide 620 may extend along some or substantially all of the lengths of the forward and aft upper portions 614 and 616-1, respectively. The curved portion 616-2 of temple 612 may be generally shaped to fit behind and/or around a user's ear. In some examples, a guide may terminate proximate or ahead of the curved portion, e.g., as illustrated in the examples in FIGS. 1-5. In such examples, the farthest position to which the electronic device may be movable may be a position at or ahead of the curved portion. In the example in FIG. 6, the bifurcated temple 612 may extend the amount of travel available to the electronic device 630 such that the electronic device 630 may be positionable farther back relative to the lens portion (not shown in this figure) and thus be better concealed from view.

FIG. 7 illustrates three examples 700, 700', and 700" of temples with guides having different geometries. In a first example 700, temple 712 includes a guide 720 which comprises a groove 722. The groove 722, when viewed in plan, has a generally rectangular shape. A distance d between the sidewalls of groove 722 remains substantially constant along the length of the groove 722. In a second example 700', temple 712' includes a guide 720'. The guide 720' comprises a groove 722', which has a tapered geometry, in plan view. In example 700', a forward portion of the groove 722' narrows towards a forward end of the groove. In a third example 700", temple 712" includes a guide 720" comprising a groove 722", which also has a tapered geometry, in plan view. In this third example 700", the groove 722" tapers toward the aft end of the groove. That is, an aft portion of the groove 722" narrows towards an aft end of the groove. As such, a distance d' between the sidewalls of the groove 722' decreases along at least a portion of the length of the groove 722'. Similarly, a distance d" between the sidewalls of the groove 722" decreases along at least a portion of the length of the groove 722".

A groove according to the present disclosure typically includes at least one sidewall and may also include a second opposite sidewall, a top wall, or combinations thereof. A sidewall is a wall of the groove that extends from a base of the groove and spans a portion of the length of the groove. A top wall is a wall of the groove that extends from one of the side walls. A top wall may be a partial wall which may be arranged generally opposite the base of the groove and may also span at least a portion of a length of the groove. In some examples, the groove may include a forward groove wall, an aft groove wall, or both. The forward and aft groove walls are walls of the groove which extend from the base of the groove and span the distance between the sidewalls. The groove 722 has an open forward end and a closed aft end. That is, the groove 722 includes an aft groove wall but does not include a forward groove wall. The groove 722' has a closed aft end and an open forward end, which is tapered. In this example, the groove 722' includes an aft wall but does not include a forward groove wall. The groove 722" has a closed forward end and an open aft end, which is tapered. That it, the groove 722" includes a forward groove wall but does not include an aft groove wall. It will be appreciated that tracks according to the present disclosure may have other geometries than the examples specifically illustrated. For example, a groove may have both a closed forward end and a closed aft end, e.g., as illustrated in FIG. 3. In some examples, the groove may taper both towards the forward end and towards the aft end. In further examples, the groove may include a closed end, which is tapered.

FIG. 8 is a partial top view of a system 800 including a temple 812 with an offset according to further examples of the present disclosure. The system 800 includes a temple 812 of an eyewear frame and an electronic device 830 (e.g., camera 832). The electronic device 830 is slidably coupled to the temple 812. The system 800 further includes a securing mechanism 850 (e.g., bands 852-1 and 852-2). The securing mechanism is configured to maintain electronic device 830 in engagement with a guide provided on the temple 812. The temple 812 includes a first portion 814 and a second portion 816. The second portion 816 is offset from the first portion 814 by an offset distance 821 selected to accommodate the securing mechanism 850 or portions thereof. For example, the offset distance 821 may be greater than or equal to a dimension 823 of the securing mechanism, such as a thickness t of any of the bands 852-1 and 852-2. In some examples, the thickness t may be about 2 mm or less. In some examples, the bands 852-1 and 852-2 may have a rounded cross-section (e.g., a circular cross-section). In such examples, the thickness may interchangeably be referred to as a diameter of the cross-section. It will be understood that embodiments of the present disclosure may include any combinations of features described with reference to any of the specific examples herein. For example, a temple may be a bifurcated temple as described with reference to FIG. 6 and may also include an offset as described with reference to FIG. 8. Temple according to the present disclosure may include any of the features of temples and/or any of the guides described herein in any combination.

With reference now to FIGS. 9-14, features of guides according to the present disclosure will be further described. A guide according to the present disclosure may include a male rail or a female groove. By male rail (interchangeably rail) it is meant that the rail includes one or more protrusions configured for insertion into a female groove. Similarly, by female groove (interchangeably groove) it is implied that the groove includes one or more grooves which are shaped to accommodate the rail at least partially therein. In some examples, the term groove is meant to imply not only an indentation in a surface of a temple but also a through feature such as a slot through a thickness of the temple. In examples herein, a female groove may comprise a single groove or a plurality of tracks, which may be located on one or more sides of a temple, for example a top side of the temple, a bottom side of the temple, an outside side of the temple, an inner side of the temple, or combinations thereof. In examples, a female groove may comprise a single groove or a plurality of tracks on any side of an electronic device. Any number of tracks may be included having any combination of geometries as may be desired. Analogously, a male rail according to the present disclosure may comprise a single rail or a plurality of rails located on one or more sides of the temple, for example a top side of the temple, a bottom side of the temple, an outside side of the temple, an inner side of the temple, or combinations thereof. In examples, a male rail may comprise a single rail or a plurality of rails on any side of an electronic device.

Any number of tracks may be included having any combination of geometries as may be desired. Attachment systems according to the present disclosure may include a first guide which is incorporated into the temple (e.g., embedded into or coupled to the temple), which may comprise either one of the rail or the groove, the attachment system further including a second guide provided on the electronic device (e.g., embedded into or coupled to the electronic device), the second guide comprising a corresponding rail or groove configured to be coupled to the rail or groove of the temple. The terms embedded or integrated are meant to imply that a feature is integral with or non-removably attached to a component (e.g., the electronic device or the temple). The term incorporated or incorporating includes coupling as well as integrating or embedding components. That is, a component which is incorporated may be removably coupled to another component or it may be embedded into the other component. It will be appreciated that the illustrations in the figures herein are provided to facilitate an understanding of the present disclosure and some or all of the temples, guides, rails, tracks, and/or features thereof may not be to scale and/or some of the illustrations may be simplified so as not to obfuscate the present disclosure. In some examples, the guide may be integral with the temple and may be part of the design of the temple. In some examples, the guide may be built into the surface contour of the temple. In some examples, the guide may manufactured separately from the temple and attached thereto, removably or irremovably, by any appropriate known techniques, for example and without limitation by screws, bolts, hooks, temperature shrink material, glue, adhesive, Velcro, magnet, strap(s). In some example, the guide may be detachable from the temple. In this regard, a separate guide, which is attachable to an existing eyewear frame may serve to address the eyewear aftermarket, e.g., for retrofitting eyewear that is already been manufactured and/or sold to consumers. In examples, a guide may be integral with the electronic device and may be part of the design of the electronic device (e.g., integral with a housing of the electronic device). In some example, the guide may be coupled to the electronic device, e.g. via a shoe or another intermediate component. In some examples, the electronic device may include a guide integral to the electronic device and may also be operable to couple to an intermediate component for engaging with different guides from the guide provided integral to the electronic device, as described in further detail below.

An attachment system according to some examples may include an elongate member configured to be coupled to a wearable article, the elongate member comprising a guide extending along a length of the elongate member and configured for slidable engagement with the electronic device. In some examples, the electronic device may be a camera. In some examples, the attachment system may be provided as a kit which includes the elongate member including a rail or a groove and the electronic device which includes the other opposing rail or groove. The elongate member may attach to the temple, for example by way of fasteners, adhesive, straps, bands, elastic rings, or the like, or using one or more magnets. In some examples, the system may also include a securing mechanism configured to bias the electronic device toward the elongate member and the wearable article when the elongate member is coupled thereto. For example, the securing mechanism may include a band, an adjustable strap, an elastic ring, a stretchable slide member, or combinations thereof. In some examples, a plurality of bands, adjustable straps, elastic rings, and/or slide members may be included in a single kit to enable the user to couple the electronic device to any of a variety of temples of different shapes and sizes. In some examples, the securing mechanism between the electronic device and the elongate member comprising the guide may be a magnetic mechanism, for example as described below with reference to FIG. 12.

According to some examples of the present disclosure, an electronic device kit may include an electronic device and a stretchable band, whereby the electronic device comprises a surface feature to engage the band and whereby the electronic device can be applied to an eyewear temple allowing movement of the electronic device and the band from a point located within the front one third of an eyewear temple to a point within the back one third of the eyewear temple while the electronic device and band remains attached to the eyewear temple and while the eyewear is being worn by a wearer. The stretchable band may be an O-ring having a rounded core cross section, for example as described with reference to FIG. 22.

FIGS. 9A-9D show cross-sectional views of guides including a male rail according to some examples herein. It will be appreciated that some or all of the temples, guides, rails, tracks, and/or features thereof may not be to scale and the illustrations are provided only to facilitate an understanding of the present disclosure. It will be further appreciated that while examples of rails described here with reference to FIGS. 9A-9F are illustrated in the context of being incorporated into a temple, any of the embodiments of rails according to the present disclosure may instead be provided on the electronic device for coupling to a rail provided on the temple.

Figure 9A:
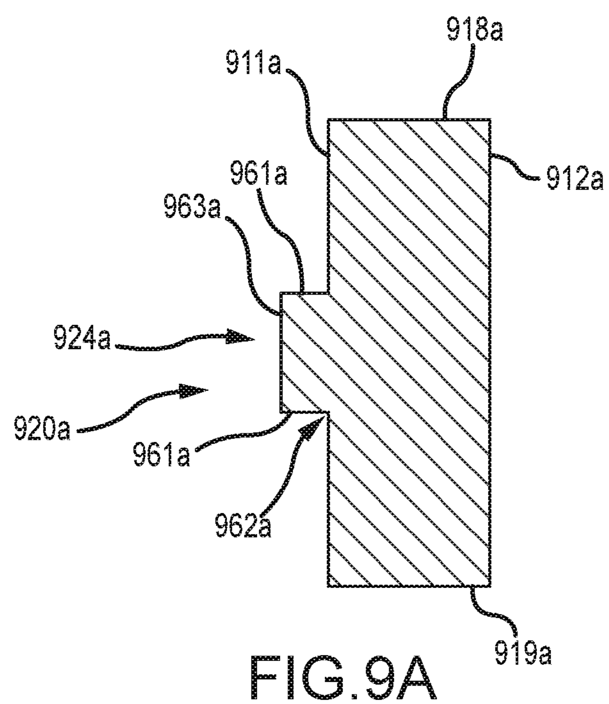
FIGS. 9A-9D are cross-sectional views of temples including guides according to some examples herein, for example a non-securing guide (FIG. 9A), and securing guides (FIGS. 9B, 9C, 9D)

FIG. 9A shows, in cross section, a temple 912*a* comprising a guide 920*a*, in this example a non-securing guide. The guide 920*a* comprises a rail 924*a* having a generally rectangular cross-sectional shape. The rail 924*a* includes sidewalls 961*a* which are generally parallel to one another from a base 962*a* to a top 963*a* of the rail 924*a*. In some examples, the rail may have a generally rounded cross-sectional shape (e.g., as shown in dashed line), such as a semi-circular cross-sectional shape or a semi-ovular cross-sectional shape. In further example, the protrusion may have a generally trapezoidal cross-sectional shape. The rail 924*a* in this example is located on an outside side 911*a* of the temple 912*a*. In some examples, the rail 924*a* may be on a top side 918*a*, a bottom side 919*a*, or combinations thereof.

Figure 9B:
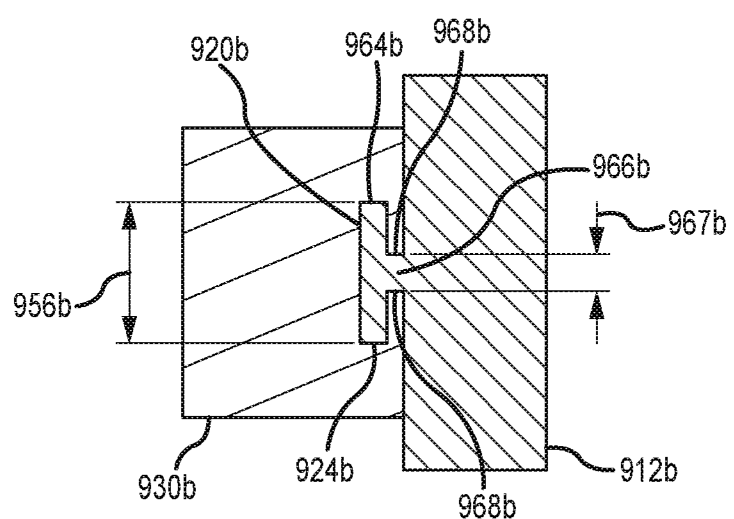

FIG. 9B shows, in cross section, another example of a temple 912*b* comprising a guide 920*b*, in this example a securing guide. The guide 920*b* comprises a rail 924*b* having a generally T-shaped cross-section. The rail 924*b* includes a head portion 964*b* and a neck portion 966*b*. The width 956*b* of the head portion 964*b* is greater than a width 967*b* of the neck portion 966*b*. By including a narrower neck portion 966*b*, the rail 924*b* is configured to engage securing features of the groove such that the electronic device 930*b* is maintained in engagement with the guide 920*b* when coupled thereto. In the example in FIG. 9B, side walls 968*b* of the neck portion 966*b* are generally parallel to one another.

Figure 9C:
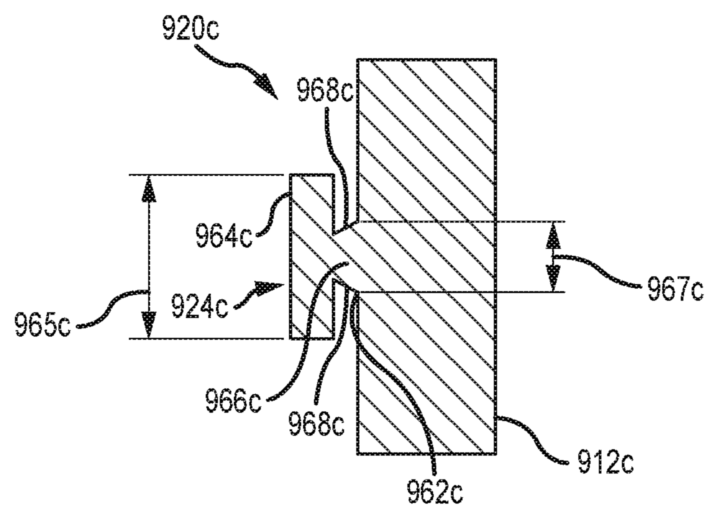

FIG. 9C shows, in cross section, a temple 912*c* comprising a guide 920*c*, in this example a securing guide. The guide 920*c* comprises a rail 924*c* which includes a head portion 964*c* and a neck portion 966*c*. A width 965*c* of the head portion 964*c* is greater than a width 967*c* of the neck portion 966*c*. In this manner, the rail 924*c* may serve to maintain an electronic device (not shown) in engagement with the guide 920*c*. In this example, the neck portion 966*c* is tapered. The side walls 968*c* of the neck portion 966*c* are angled towards one another such that a width 967*c* of the neck portion 966*c* decreases from a base 962*c* of the rail 924*c* towards the head portion 964*c*.

Figure 9D:
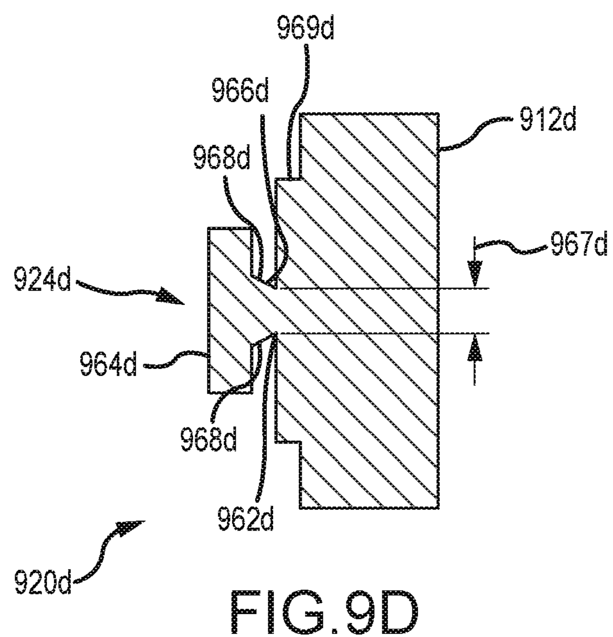

FIG. 9D shows, in cross section, a temple 912*d* comprising a guide 920*d*, in this example a securing guide. The guide 920*d* comprises a rail 924*d* including a head portion 964*d* and a neck portion 966*d*. The neck portion 966*d* is arranged on a platform 969*d*, which may provide clearance for certain features and/or components of an electronic device coupled to the temple 912*d*. In this example, the neck portion 966*d* may be configured similarly to the neck portion 966*c* in that it tapers along its length. However, in this example, the neck portion 966*d* tapers in an opposite direction of neck portion 966*c* in FIG. 9C. Side walls 968*d* of the neck portion 966*d* may be angled towards one another such that a width 967*d* of the neck portion decreases from the head portion 964*d* towards the base 962*d* of the rail 924*d*. In other examples, the neck portion 966*d* may taper in the same direction as in the example in FIG. 9C.

Referring now to FIGS. 10-14, temples including guides comprising tracks according to examples herein will be further describes. The tracks may have virtually any shape as may be desired, for example, the tracks may have a generally rectangular, square, rounded, triangular, trapezoidal or inverted trapezoidal shape, or any combinations thereof. While tracks having different cross sections are described with reference to guides on a temple, guides on electronic devices which include tracks with any of the cross sections described herein are also within the scope of this disclosure.

Figure 10A:
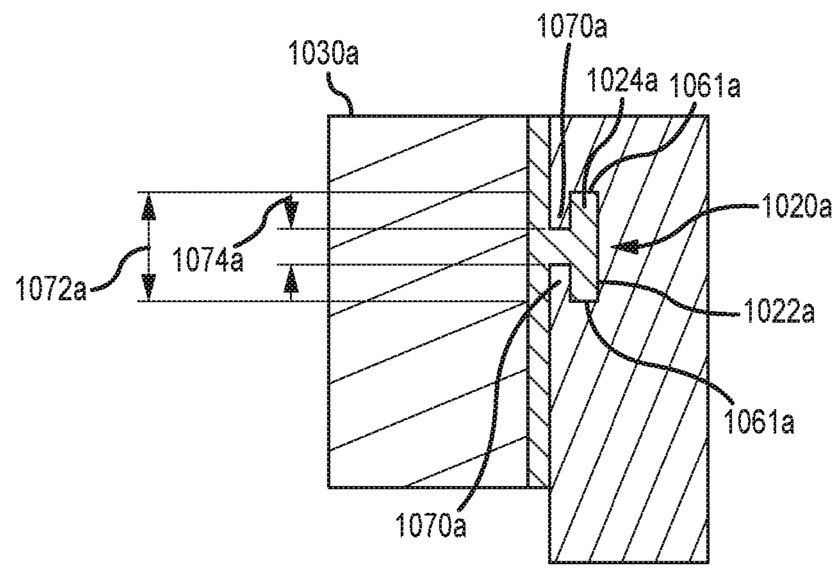
FIGS. 10A and 10B are cross-sectional views of guides including a female groove according to some examples herein.
Figure 10B:
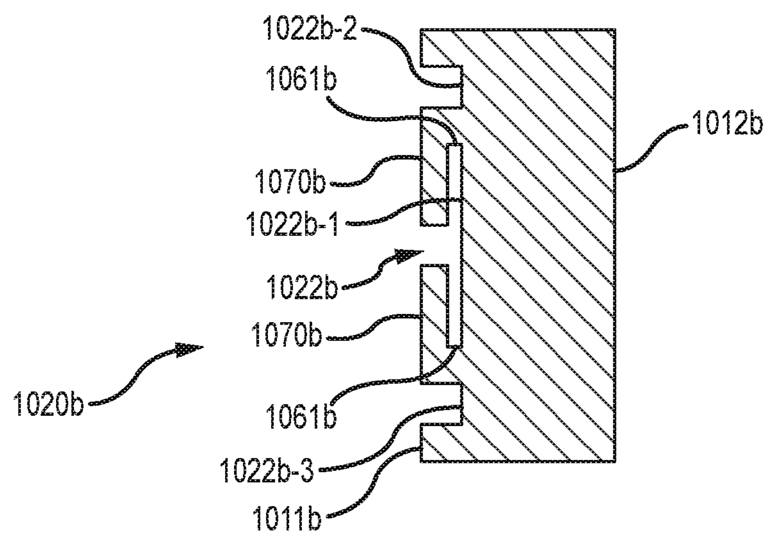

FIGS. 10A and 10B show cross-sectional views of temples comprising guides 1020*a* and 1020*b*, both configured as securing guides. Guide 1020*a* in FIG. 10A includes a groove 1022*a* having an inverted generally T-shaped cross section. The groove 1022*a* is configured to receive a rail 1024*a* of an electronic device 1030*a*, the rail 1024*a* having a generally T-shaped cross-section. The rail 1024*a* may include some or all of the features of rail 924*b* described previously with reference to FIG. 9B. To that end, the groove may have a first width 1072*a* selected to accommodate a head portion of the rail and a second width 1074*a* selected to accommodate a neck portion of the rail, the second width being smaller than the width of the head portion. The groove may comprise a groove defined by sidewalls 1061*a* and partial top walls 1070*a* extending towards one another from the sidewalls. The partial top walls 1070*a* may extend inward towards the neck portion thereby retaining the rail into engagement with the groove.

Guide 1020*b* in FIG. 10B is a securing guide which comprises a plurality of tracks 1022*b* including first groove 1022*b*-1, second groove 1022*b*-2, and third groove 1022*b*-3. In this examples, one of the tracks features for securing a rail on the electronic device into engagement with the guide 1020*b*. For example, the first groove 1022*b*-1 may include some or all of the features of groove 1022*a* described with reference to FIG. 10A. For example, groove 1022*b*-1 includes a groove which has an inverted generally T-shaped cross section defined by sidewalk 1061*b* and partial top walls 1070*b* extending towards one another from the sidewalls. Other ones of the plurality of tracks may be securing or non-securing and may have virtually any geometry as may be desired. In the specific example herein, grooves 1022*b*-2 and 1022*b*-3 are non-securing and have a generally rectangular geometry. All of the grooves in this example are arranged on an outside side 1011*b* of the temple 1012*b*. In other example, grooves may be disposed on a top side, bottom side, outside side, inner side, or combinations thereof. In the context of the present disclosure, the outside side of the temple is the side of the temple which is farthest away from the wearer's head, when the eyewear is worn, and the inner side being the side closest to the wearer's head. The top side is the side closest to a top of the wearer's head and the bottom side is the side opposite the top side and farthest from the top of the wearer's head. It will be understood that the designations of top, bottom, inner and outside are arbitrary but provided herein for illustration of examples of the present disclosure.

With reference now also to FIGS. 11A-11F, further examples of guides comprising tracks according to the present disclosure are described. FIGS. 11A-11F are cross-sectional views of guides including at least one groove disposed on a top side of the temple.

Figure 11A:
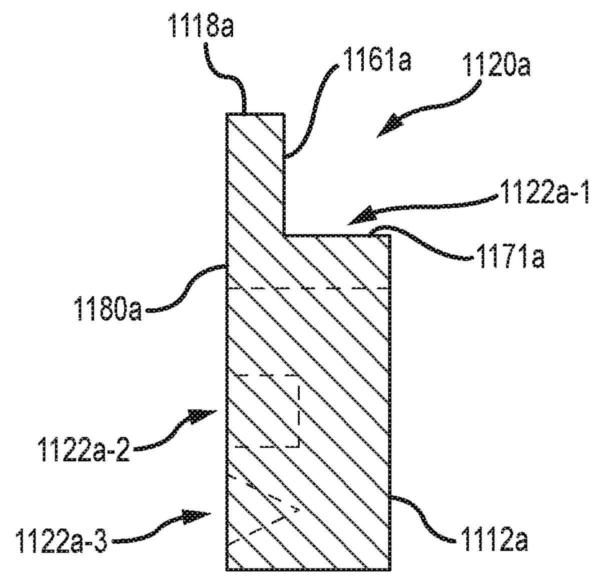
FIGS. 11A-11F are cross-sectional views of guides according to further examples herein.

FIG. 11A shows a cross-sectional view of a temple 1112*a* including a guide 1120*a*, in this example a non-securing guide having an open groove geometry. The groove 1122*a*-1 has a generally L-shaped cross section defined by a base 1171*a* and a single sidewall 1161*a*. The guide 1120*a* in this example is located on a top side 1118*a* of the temple 1112*a*. In some examples, the temple may include a metal portion 1180*a*, indicated generally by the dashed line, and the groove 1122*a*-1, may be located in the metal portion 1180*a*. Locating the groove in the metal portion may enhance the structural integrity of the groove which may have a relatively thin sidewalls, in some examples, the guide may include additional tracks, for example tracks located on an outside side of the temple (e.g., tracks 1122*a*-2, 1122*a*-3) or on a bottom side of the temple as will be described further with reference to FIG. 11F. The tracks may have virtually any geometry, for example a second groove 1122*a*-2 may have a generally U-shaped cross section. In some examples, a third groove 1122*a*-3 may have a generally V-shaped cross section defined by a groove with walls angled to one another towards a base of the groove.

Figure 11B:
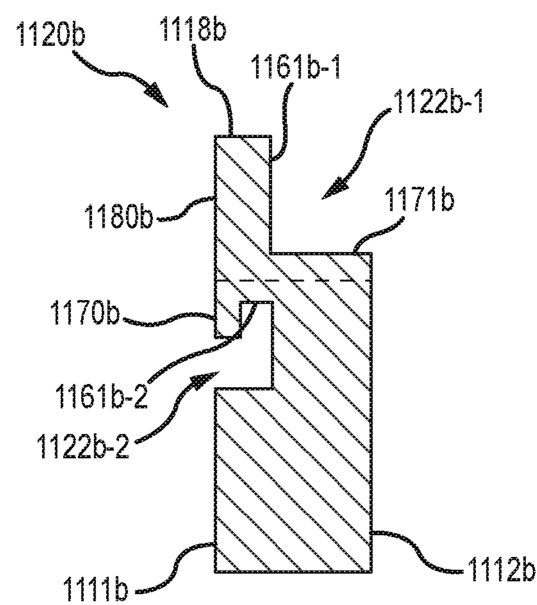

FIG. 11B shows a cross-sectional view of a temple 1112*b* including a guide 1120*b*, in this case a securing guide. The guide 1120*b* includes a plurality of tracks including a first groove 1122*b*-1 and a second groove 1122*b*-2. The first groove 1122*b*-1 is located on a top side 1118*b* of the temple 1112*b*. The first groove 1122*b*-1 has an open groove geometry. That is, groove 1122*b*-1 has a generally L-shaped cross section defined by a base 1171*b* and a single sidewall 1161*b*-1. The second groove 1122*b*-2 is located on a side of the temple adjacent to the top side 1118*b*, in this cases the outside side 1111*b*. groove 1122*b*-1 is configured to constrain the downward and partially the lateral movement of the electronic device (not shown) relative to guide 1120*b*. groove 1122*b*-2 constrains the upward movement as well as lateral movement of the electronic device. The second groove includes a partial top wall 1170*b*, which extends from one of the sidewalls 1161*b*-2 of the second groove. In this manner, the second groove also restrains a rotational degree of freedom of the electronic device when the electronic device is coupled thereto by virtue of the partial top wall. The first and second tracks also constrain the remaining two rotational degrees of freedom to thereby guide the electronic device along a longitudinal direction of the temple (e.g., in and out of the page). In this manner, the combined first and second tracks function as a securing guide. The temple 1112*b* may, in some examples, include a metal portion (e.g., portion 1180*b*) and the first groove, the second groove, or both may be located in the metal portion.

Figure 11C:
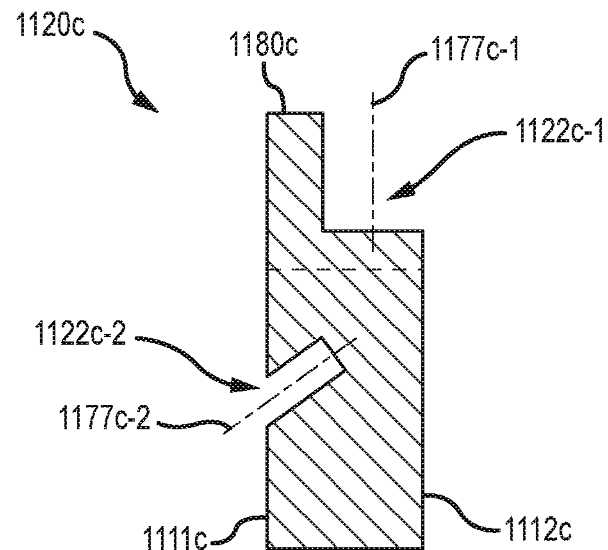

FIG. 11C shows a cross-sectional view of a temple 1112*c* including a guide 1120*c*, in this case a securing guide. The guide 1120*c* includes a plurality of tracks including a first groove 1122*c*-1 and a second groove 1122*c*-2. The first groove 1122*c*-1 may be similar to groove 1122*b*-1 of the example in FIG. 11B. For example, groove 1122*c*-1 is located on a top side of the temple and has an open groove geometry. The second groove 1122*c*-2 is located on an adjacent side of temple 1112*c*, in this case on the outside side 1111*c*. The temple 1112*c* may, in some examples, include a metal portion (e.g., portion 1180*c*) and the first groove, the second groove, or both may be located in the metal portion. The second groove 1122*c*-2 may be angled relative to the first groove 1122*c*-1, which may improve functionality of guide 1120*c* as a securing guide. For example, groove 1122*c*-2 may be oriented such that centerline 1177*c*-2 of groove 1122*c*-2 defines an obtuse angled relative to centerline 1177*c*-1 of groove 1122*c*-1. Such relative orientation of the tracks 1122*c*-1 and 1122*c*-2 may better constrain any rotation of an electronic device coupled thereto about the longitudinal direction of temple 1112*c*.

Figure 11D:
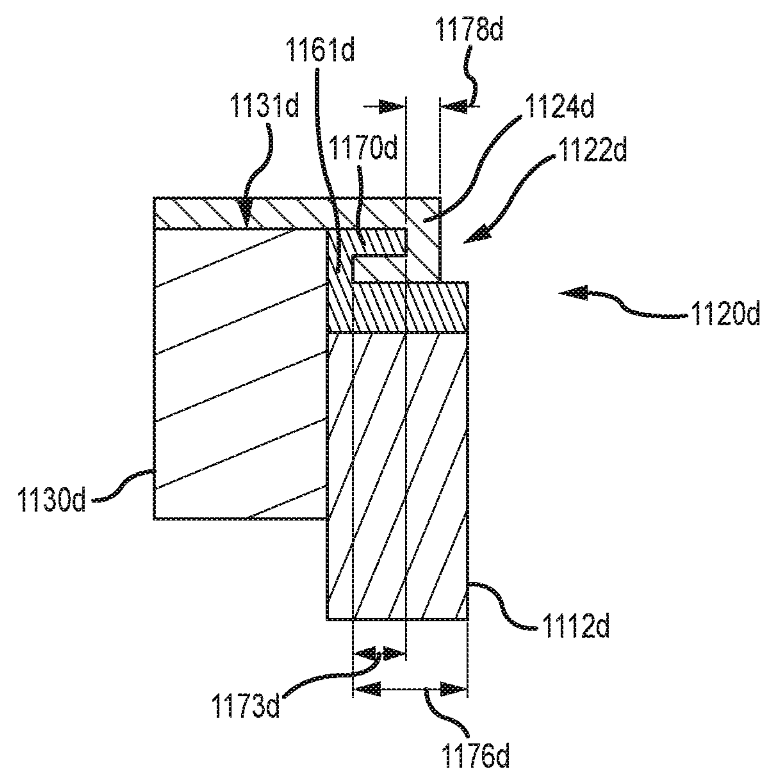

FIG. 11D shows a cross-sectional view of a temple 1112*d* including a guide 1120*d*, in this case a non-securing guide. The guide 1120*d* includes a groove 1122*d* which is located on a top side of the temple and has a generally C-shaped geometry. That is, groove 1122*d* comprises a groove (e.g., a hook groove), which includes a single sidewall 1161*d* and a top wall 1170*d*. The top wall 1170*d* may be a partial top wall having a width 1173*d* selected such that component(s) of the electronic device 1130*d* and/or attachment system (e.g., rail 1124*d*) does not contact the user's head when the rail is provided into engagement with the groove. For example, the top wall 1170*d* may have a width 1173*d* which is less than a width 1176*d* of the base of the groove by an amount which is substantially the same or greater than a cross-section dimension 1178*d* of the rail 1124*d*. The groove 1122*d* is configured to engage with a rail 1124*d* which may extend from a top side 1131*d* of the electronic device 1130*d*. However, in some examples the rail 1124*d*. may extend from another wall, for example a bottom wall, or a sidewall of the electronic device 1130*d*.

Figure 11E:
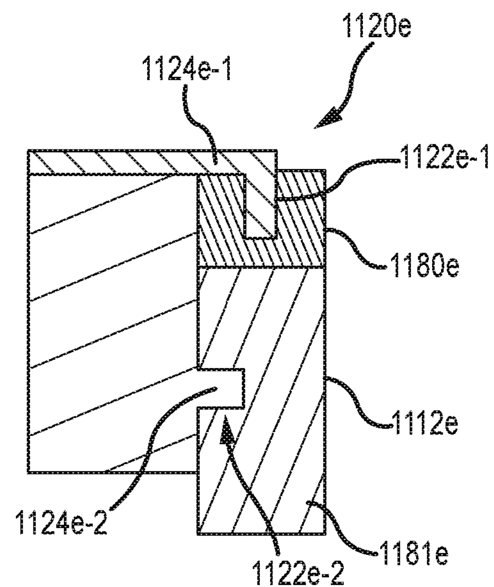

FIG. 11E shows a cross-sectional view of another example of a temple 1112*e*comprising a guide 1120*e*, in this case a securing guide. The guide 1120*e* includes a plurality of tracks, including a first groove 1122*e*-1 configured to receive a first rail 1124*e*-1 and a second groove 1122*e*-2 configured to receive a second rail 1124*e*-2. The first and second groove 1122*e*-1, 1122*e*-2, respectively, are located on adjacent sides of the temple 1112*e*, in this case the top side and outside side, respectively. The first groove 1122*e*-1 is a generally U-shaped groove comprising a groove defined by opposing sidewalls. The second groove 1122*e*-2 is a also a generally U-shaped groove (e.g., a groove having a generally rectangular cross section). The temple 1112*e* may include one or more metal portions, e.g., metal portion 1180*e*. One or more of the tracks may be in the metal portion, in this example the first groove 1122*e*-1 is in the metal portion 1180*e* and the second groove 1122*e*-2 is in a plastic portion 1181*e* of the temple. It will be understood that the temple, in some examples may not include a plastic portion and may be made entirely of metal. In some examples, the temple may be made entirely of plastic. In some examples, the temple can be made of both plastic and metal. In some cases the temple can comprise one of or any combination of, by way of example only, plastic, rubber, metal, wood. The guide can be made of the same material as that of the temple or different material than that of the temple. In many examples the guide is comprised of the same material and finish as that of the finished outer surface of the temple. In many examples, the guide is a contour design of the outer finished surface of the temple. In many examples, the guide is free of an aperture and maintains the integrity of the outside finish of the temple.

Figure 11F:
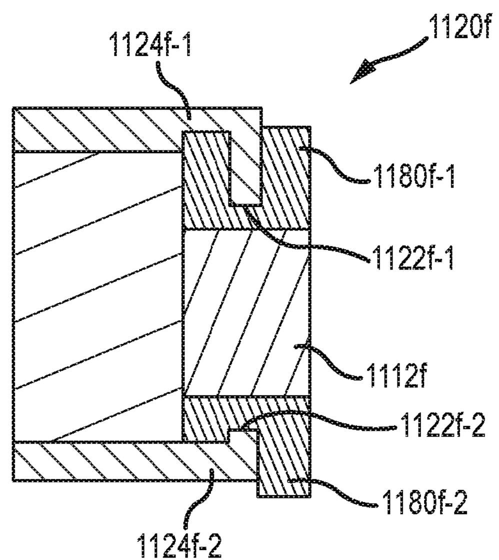

FIG. 11F shows a cross-sectional view of yet another example of a temple 1112*f* comprising a guide 1120*f*, in this case a securing guide. The guide 1120*f* includes a plurality of tracks, including a first groove 1122*f*-1 configured to receive a first rail 1124*f*-1 and a second groove 1122*f*-2 configured to receive a second rail 1124*f*-2. The first and second groove 1122*f*-1, 1122*f*-2, respectively, are located on opposite sides of the temple 1112*f*, in this case the top side and bottom side, respectively. The first groove 1122*f*-1 is a generally U-shaped groove comprising a groove defined by opposing sidewalls. The second groove 1122*f*-2 is also a generally U-shaped groove (e.g., a groove having a generally rectangular cross section). The second groove 1122*f*-2 comprises sidewalls having dissimilar heights. The temple 1112*f* may include one or more metal portions, e.g., metal portions 1180*f*-1 and 1180*f*-2. One or more of the tracks may be in the metal portion, in this example both the first and second tracks 1122*f*-1, 1122*f*-2, respectively are in the metal portions 1180*f*-1, 1180*f*-2.

Figure 12A:
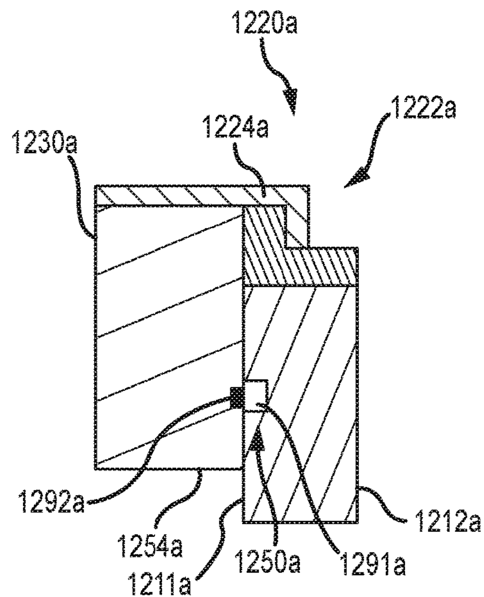
FIGS. 12A-12C are cross-sectional views of securing guides including magnetic means for securing the electronic device to the temple.
Figure 12B:
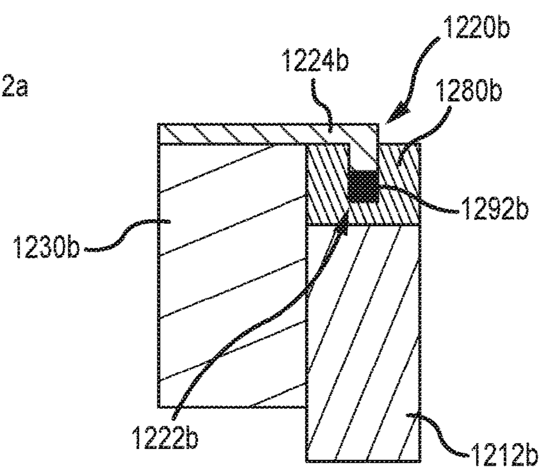
Figure 12C:
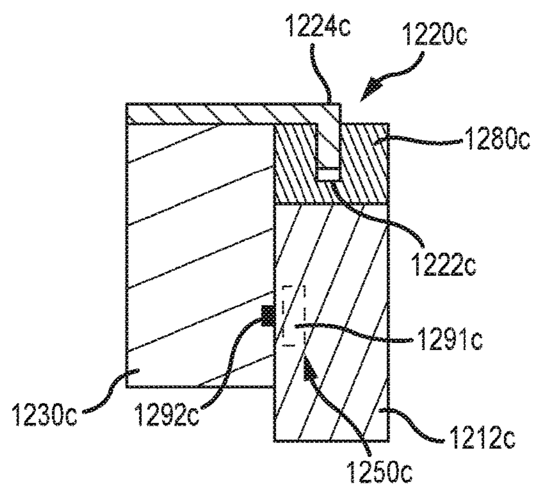

FIGS. 12A-12C are partial cross-sectional views of further examples of systems according to the present disclosure. The systems in FIGS. 12A-12C include magnetic means for securing an electronic device to the temple. FIG. 12A shows a cross section of a temple 1212*a* comprising a guide 1220*a* which is similar to the guide 1120*a* in FIG. 11A. For example, the guide includes a groove 1222*a* having a generally L-shaped cross section and located on a top side of the temple 1212*a*, the groove 1222*a* configured to receive a rail 1224*a* coupled to or integrated with the electronic device 1230*a*. The system further includes a securing mechanism 1250*a* coupled to the temple 1212*a*. The securing mechanism 1250*a* includes a metallic strip 1291*a* located on the outside side 1211*a* of the temple 1212*a*. The metallic strip 1291*a* is positioned for engagement with a magnet 1292*a* located on the electronic device 1230*a*. In this example, the metallic strip 1291*a* is located in an indentation in the surface of the temple 1212*a* with one side of the metallic strip 1291*a* exposed. The metallic strip 1291*a* may be removably or irremovably attached to the temple 1212*a*. The magnet 1292*a* may be attached to or embedded within a housing 1254*a* of the electronic device 1230*a*. The metallic strip 1291*a* may extend substantially along the length of the groove such that the magnet may retain, via magnetic attraction, the electronic device 1230*a* in engagement with the guide at any position of the electronic device along the groove.

FIG. 12B shows a cross section of another example of a system including a temple 1212*b*. The temple 1212*b* includes a guide 1220*b* according to the present disclosure. In this example, the guide 1220*b* includes a groove 1222*b* having a generally U-shaped cross section and located on a top side of the temple 1212*b*, the groove 1222*b* configured to receive a rail 1224*b* coupled to or integrated with the electronic device 1230*b*. The temple 1212*b* includes a metal portion 1280*b* and the groove 1222*b* is in the metal portion 1280*b*. The electronic device 1230*b* is slidably engaged with the guide 1220*b* and is further secured into engagement with the guide 1220*b* by means of magnetic attraction. To that end, the rail 1224*b* includes a magnet 1292*b*, which may be coupled to an end of the rail 1224*b* or it may be embedded within the rail 1224*b*. In some examples, the rail 1224*b* itself or portions thereof may be made of a magnetic material. In this manner, the magnet 1292*b* which is coupled to the electronic device 1230*b* may maintain the electronic device 1230*b* in engagement with the guide 1220*b*, e.g., by way of magnetic attraction between the magnet 1292*b* and metal portion 1280*b* in which the groove 1222*b* is provided.

FIG. 12C shows a cross section of yet another example of a system including a temple 1212*c* which includes a guide 1220*c* according to the present disclosure. In this example, the guide 1220*c* includes a groove 1222*c* having a generally U-shaped cross section and located on a top side of the temple 1212*c*, the groove 1222*c* configured to receive a rail 1224*c* coupled to or integrated with the electronic device 1230*c*. The temple 1212*c* may include a metal portion 1280*c*, and the groove 1222*c* may be in the metal portion 1280*c*. The electronic device 1230*c* is slidably engaged with the guide 1220*c* and is further secured into engagement with the guide 1220*c* by means of magnetic attraction. To that end, the system may include a securing mechanism 1250*c* comprising a metallic strip 1291*c* which may be embedded in the temple 1212*c*. The metallic strip 1291*c* may be positioned for engagement with a magnet 1292*c* which may be coupled to or embedded within the electronic device. It will be appreciated that in other examples, the location of the magnet and metallic material may be reversed, for example, the temple may include a strip of magnetic material coupled to or embedded within the temple and the electronic device may include a metallic member coupled to or embedded in the electronic device.

FIGS. 13A-13E are views of a camera (also referred to as camera system or self-contained point and shoot camera) according to some examples of the present disclosure. The camera 10 includes an image capture device 12, which may be located in a first portion 20, e.g., a forward portion, of the camera 10. The camera 10 further includes a battery 14 and circuitry 16, which may be located in a second portion 21, e.g., an aft portion, of the camera 10. The camera 10 may be coupled to a temple of an eyewear, for example by slidably engaging the camera 10 with a guide incorporated into the temple, e.g., as illustrated in FIG. 14A and FIGS. 19 and 20. The camera 10 may include one of a groove (e.g., groove 22) or a rail and may engage with a rail or a groove provided on the temple. The groove or rail may be coupled to a housing 23 of the camera 10 or it may be integral with the housing 23. The electronic device in the form of a camera can comprise a female groove that acts to engage a non-securing guide in the form of a male rail on the outside side of the temple. The electronic device in the form of a camera can comprise a male rail that acts to engage a non-securing guide in the form of a female groove on the outside side of the temple. The electronic device in the form of a camera can comprise a male rail that acts to engage a securing guide in the form of a female groove on the outside side of the temple. The electronic device in the form of a camera can comprise a female groove that acts to engage a securing guide in the form of a male rail on the outside side of the temple.

In some examples, the camera may include software for automatically centering an image, also referred to as auto-centering or auto-alignment software. Auto-centering or auto-alignment software may be embedded software on the camera or may reside on a remote electronic device (e.g., a smart phone or other mobile device to which the camera may be communicatively coupled to transfer images thereto). In examples, the circuitry 16 of camera 10 may include a processor and memory comprising processor-executable instructions (e.g., software) for modifying an image prior to or after capture of the image. For example, the instructions may program the camera to adjust a size and/or orientation of the image. In some examples, the memory may include instructions for centering an image captured by the camera. The instructions may program the camera to detect a center of the image and relocate the center of the image by cropping the image.

In some examples, the instructions may program the camera to center the image in a horizontal direction by detecting a horizontal center of the image and cropping the image in the horizontal direction such that the horizontal center is equally spaced between left and right sides of the image. Instructions for centering an image in a horizontal direction may include instructions for counting a number of objects (e.g., a number of people, a number of heads) in an image and determining the horizontal center of the image by referencing a first look-up table. The first look-up table may, for example, indicate that if five heads are counted, the horizontal center of the image is at or near the third head. The first look-up table may indicate that if two heads are counted, the horizontal center of the image is at or approximately between the two heads. Instructions for centering an image in the horizontal direction may thus include instructions for automatically relocating the horizontal center of the image to a location determined based on the information in the first look-up table.

Instructions for centering an image in a vertical direction may include instructions for determining a position of the horizon, for example by detecting a color difference. For example, the instructions may program the camera to detect a first object in the captured image which corresponds to the sky and a second object in the captured image which corresponds to the ground or land based on a difference in color between the first and second objects in the captured image. The instructions may further program the camera to crop the image such that the horizon is relocated to a new position. The new position may be determined by referencing a second look-up table. The second look up table may indicated that an image may be centered in the vertical direction by relocating the horizon to a position at which the image comprises a certain percentage of sky and a certain percentage of land, for example 50% sky and 50% land, or 40% sky and 60% land, or 30% sky and 70% land, any percentages in between. In some examples, the instructions may program the camera to crop the image such that the horizon is relocated to a position at which the image comprises about ⅓ sky and ⅔ land.

The first portion 20 of the camera 10 may be pivotably coupled to the second portion 21 of the camera 10 using a pivot joint 18, such that an orientation of the image capture device 12 may be changed. For example, the forward portion 20 may be coupled to the aft portion 21 using a ball and socket type joint, e.g., as best seen in the cross-sectional view in FIG. 13E. In other examples, the forward and aft portions 20, 21, respectively, may be pivotably coupled to one another using a pin and connector type joint. Any suitable pivot joint may be used. In some examples, the pivot joint may enable rotation of the forward portion 20 and thereby the image capture device 12 about a first axis, a second axis, a third axis, or combinations thereof, the first, second, and third axes being generally parallel with respective x, y and z axes of the camera.

The camera 10 includes a rail which may be inserted into a groove provided on the temple. In the case of a non-securing groove, the camera 10 may include securing features for engaging with a securing mechanism and thereby maintaining the camera 10 into engagement with the temple. The camera 10 in the example in FIGS. 13A-13E includes surface features 13 configured to engage with a securing mechanism in the form of a stretchable band (not shown in this figure). The surface features 13 may be ribs, which may be spaced apart a sufficient distance to accommodate the securing mechanism in the form of a stretchable band there between. The camera 10 in this example further includes features 15 for engaging with attachment features of a shoe (also not shown in this figure). That is, the camera 10 of this example may be coupled to the temple having a groove via the rail 22 embedded into the camera. In some examples, e.g., if a user wishes to couple the camera 10 to a temple which instead comprises a rail, the camera 10 may be coupled to a shoe which may comprise a groove configured to be received in the rail of the temple. The camera 10 of this particular example is operable to be coupled to any number of temples comprising a variety and/or types of rails or tracks.

Figure 13A:
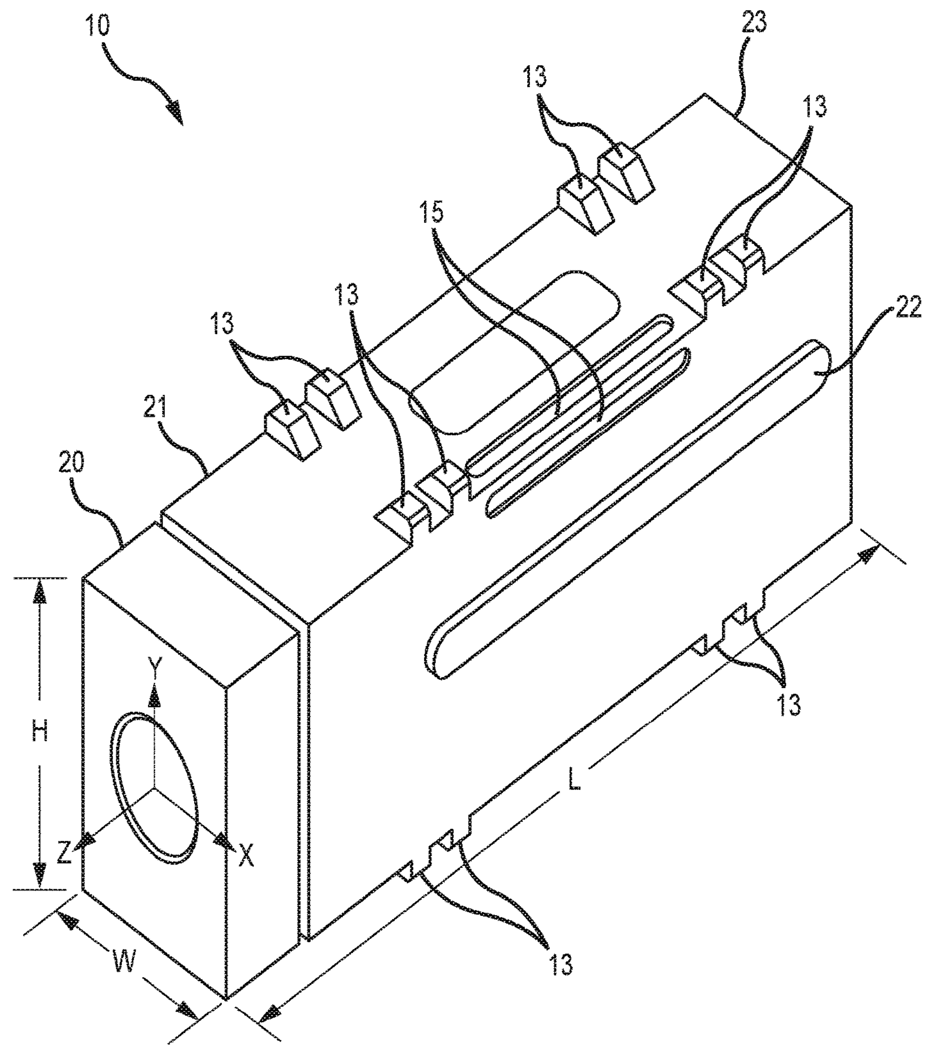
FIGS. 13A-13E are views of a camera according to some examples of the present disclosure.
Figure 13B:
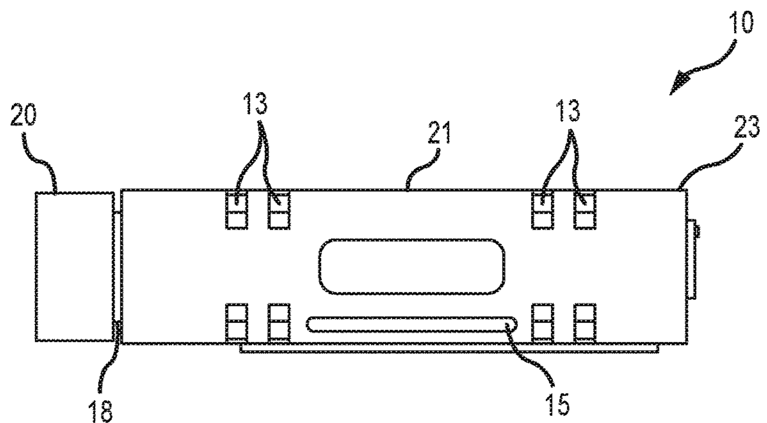
Figure 13C:
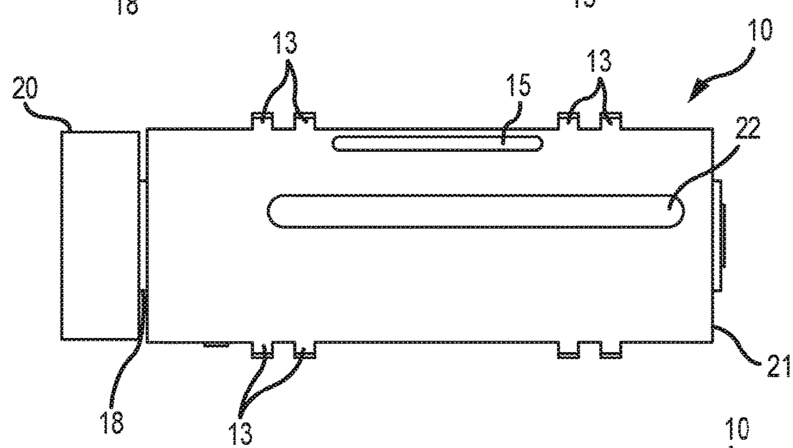
Figure 13D:
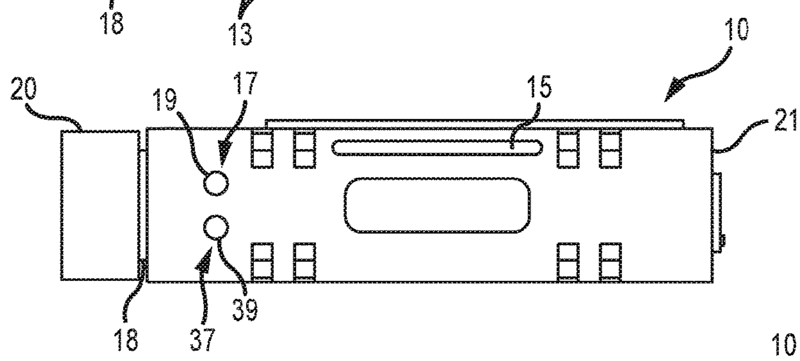
Figure 13E:
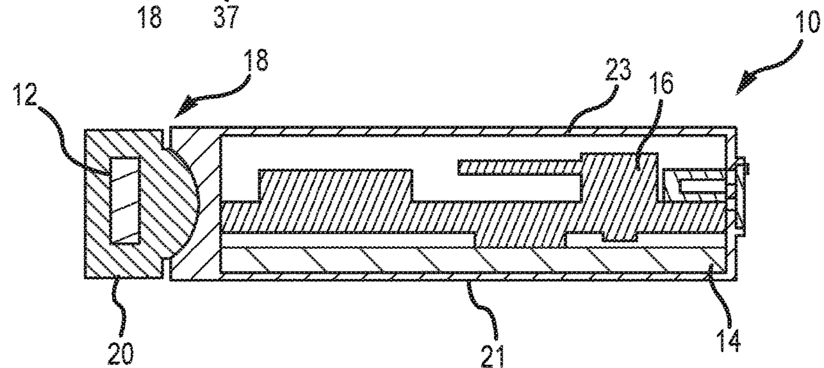
Figure 14A:
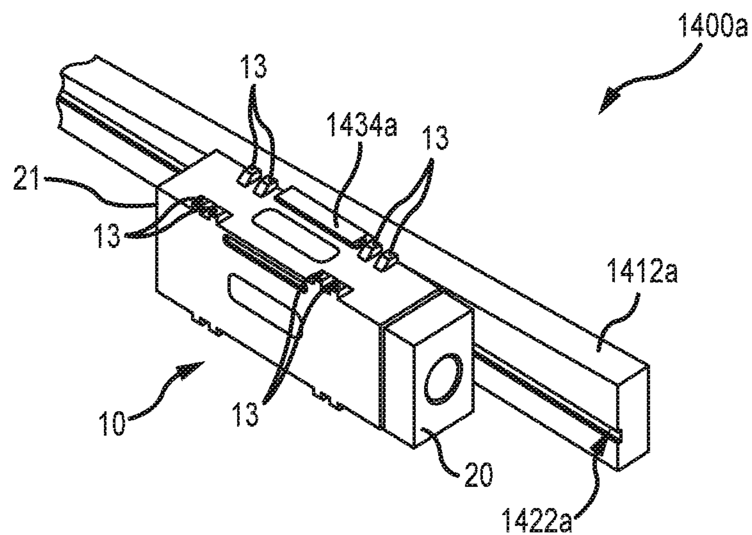
FIGS. 14A and 14B are views of cameras configured for slidable engagement with a temple using a shoe according to some examples herein.

In some examples, as best seen in FIG. 13D, the camera 10 may include a privacy indicator 17. The privacy indicator may comprise one or more LEDs 19 which may illuminate when an image (e.g., a still image or video) is being captured. The illumination may notify others that an image is being captured. In some examples, the camera may also include a functional indicator 37 which may provide feedback to the wearer as to whether an image was successfully captured. For example, the functional indicator 37 may include one or more LEDs 39 which may for example, illuminate, change color, or blink upon the successful capture of the image. In some examples, an illumination in one color may indicate a successful capture while illumination in a different color may indicate a failed capture. In other examples, successful or failed capture may be indicated by way of different number or different speed of blinking of the LED. In yet further examples, the functional indicator may include a vibration source, a speaker, a buzzer, or other audio generating device and the feedback may be provided by tactile or audible means.

The cameras according to the present disclosure may be a miniaturized self-contained electronic device. The camera may have a length L of about 8 mm to about 50 mm. In some examples, the camera may have a length from about 12 mm to about 45 mm. In some examples, the camera may have a length not exceeding 30 mm. In some examples the camera may be about 12 mm long. The camera may have a width W of about 6 mm to about 12 mm. In some examples, the camera may be about 8 mm wide. In some example, the camera may have a width not exceeding about 10 mm. In some example, the camera may have a height of about 6 mm to about 12 mm. In some examples, the camera may be about 8 mm high. In some examples, the camera may have a height H not exceeding about 10 mm. In some examples, the camera may weigh from about 5 grams to about 10 grams. In some examples the camera may weigh be about 7 grams or less. In some examples, the camera may have a volume of about 6,000 cubic millimeters or less. In some examples, the camera may have a volume of about 3,000 cubic millimeters or less. In some examples, the camera may have a volume of about 2,000 cubic millimeters or less. In some examples, the camera may be a waterproof camera. In some examples, the camera can be water resistant. In some examples, the camera can be sweat resistant. In some examples, the camera may include a compliant material or coating on an external surface of the housing 23, for example to reduce or eliminate the camera damage (e.g., scratches) to the finished surface of the eyewear temple including the guide as the camera is moved along the guide.

The camera may be configured to capture an image (e.g., still image or video image). An image capture functionality of the camera may be activated by a variety of triggers, for example by a touch switch, membrane switch, capacitance switch or sensor, motion detector sensor such as by way of example only, a micro accelerometer, voice or sound recognition system. In some examples, the swipe of a finger forward or backward may serve as a trigger and may cause an image to be captured. In other examples, a tap of the temple of the eyewear, or a movement of a forced blink may cause an image to be captured. In some examples, a tap of the temple or a tapping of the temple can cause the camera to capture an image.

In yet further examples, the clicking of the wearer's teeth may serve as a trigger and may cause an image to be captured. When the wearer clicks his or her teeth, a sound may be generated which may function as the trigger. In yet further examples, the trigger may be a predetermined word, tone, or a phrase. In examples according to the present disclosure, the circuitry 16 may include voice recognition software. The camera may include a microphone, which may detect the sound such that the camera may determine if a trigger has been generated. If a trigger was generated, the image capture functionality of the camera may be activated responsive to the trigger.

Figure 14B:
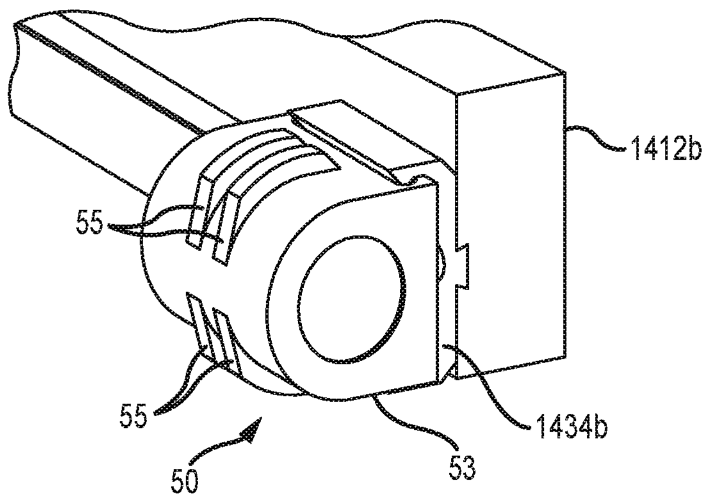

FIGS. 14A and 14B are partial views of systems including electronic devices configured for slidable engagement with a temple using a shoe according to some examples herein. The system 1400*a* in FIG. 14A includes an electronic device which may be the camera 10 of FIGS. 13A-13E. The camera 10 is coupled to a temple 1412*a* via a shoe 1434*a*. The temple 1412*a* includes a female groove 1422*a*, which may be a securing groove. The shoe 1434*a* may include a securing rail, in which case no additional means for securing the camera 10 to the temple 1412*a* may be required. In some examples, the groove may be a non-securing groove and the system may further include one or more bands which may engage with the surface features 13 on the camera 10.

FIG. 14B shows another example of a camera 50 having a generally cylindrical or semi-cylindrical body. The camera 50 may include an image capture device, a battery and circuitry within a single housing 53. The camera 50 may be slidably coupled to the temple 1412*b* using a shoe 1434*b*. The temple 1412*b* in this example includes a securing guide, comprising a groove with a generally trapezoidal cross-section. The shoe 1434*b* includes a rail with an inverted generally trapezoidal cross-section. The groove incorporated into temple 1412*b* and the rail on the shoe 1434*b* are configured to form a slidable dovetail joint, which not only serves to guide movement of the camera 50 along the groove but also secures the camera 50 to the groove and thereby secures the camera 50 to the temple 1412*b*. The camera 50 may optionally include surface features 55 for engaging with a band (e.g., an elastic ring, a strap), in the even that a user desires to couple the camera 50 to a temple which includes a non-securing guide, e.g., as show in the example in FIG. 15 and described further below.

Figure 15:
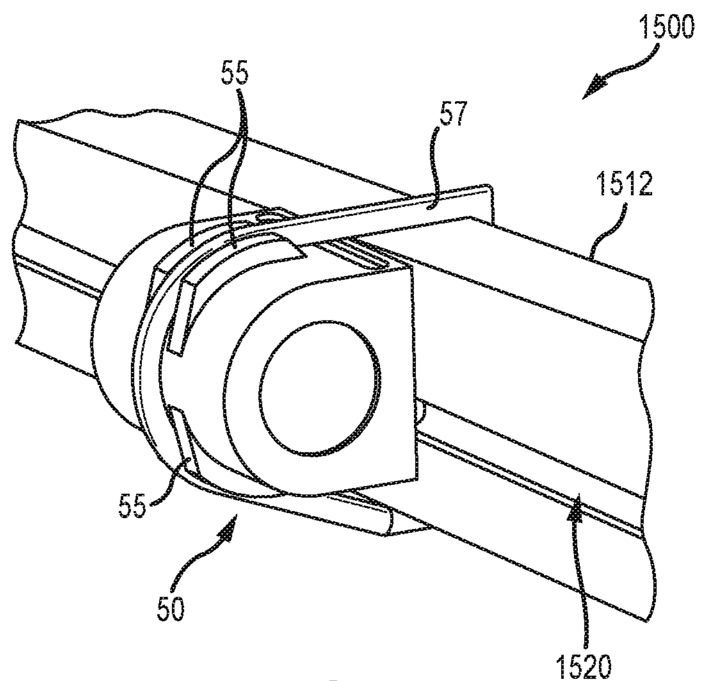
FIG. 15 is a view of a camera according to further examples of the present disclosure.

FIG. 15 shows a partial view of a system 1500 including an electronic device (e.g., camera 50) configured for slidable engagement with a temple 1512. The temple 1512 in FIG. 15 comprises a guide 1520, which is a non-securing guide. The guide may be implemented according to any of the example herein. The camera includes surface features 55 (e.g., ribs) configured to engage with a band 57 (e.g., an elastic ring such as an O-ring). The band 57 (e.g., an elastic ring) biases the camera 50 towards the temple 1512 such that the camera 50 remains into engagement with the guide 1520, while the elasticity of the band 57 allows for movement of the camera 50 along the temple 1512, the thickness and/or width of which may vary along the length of the temple 1512. In the examples in FIGS. 14-15, the cameras are positioned adjacent to an outside side of the temple. It will be understood that cameras which are positioned adjacent a top side, a bottom side and/or an interior side of the temple are within the scope of the present disclosure.

Figure 16:
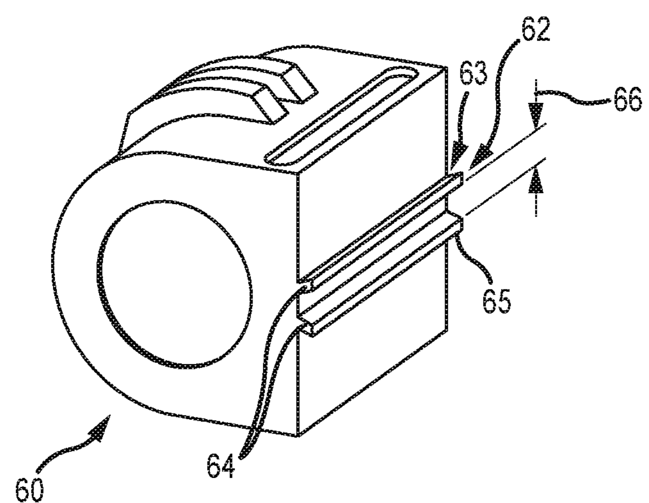
FIG. 16 is a view of a camera according to yet further examples of the present disclosure.

FIG. 16 shows a partial view of another example of a camera 60 according to the present disclosure. The camera

60 is configured for engagement with a securing guide. The camera 60 includes a rail 62 comprising a pair of legs 64 spaced a distance 66 apart from one other. A rail comprising a plurality of legs may be referred to as a split rail. In this example, the distance 66 between the legs increases from the base 63 of the rail to the top 65 of the rail. The rail 62 is configured to be inserted into a groove having a generally trapezoidal geometry. When inserted therein, the rail 62 and groove form a slidable dovetail joint. By using a split rail as in this example rather than a solid rail having an inverted generally trapezoidal cross section, the system may offer an added weight savings. Variations of split rail configurations may further enable coupling between the rail and the groove by way of a snap fit as will be described further with reference to FIGS. 17A-17C.

Figure 17A:
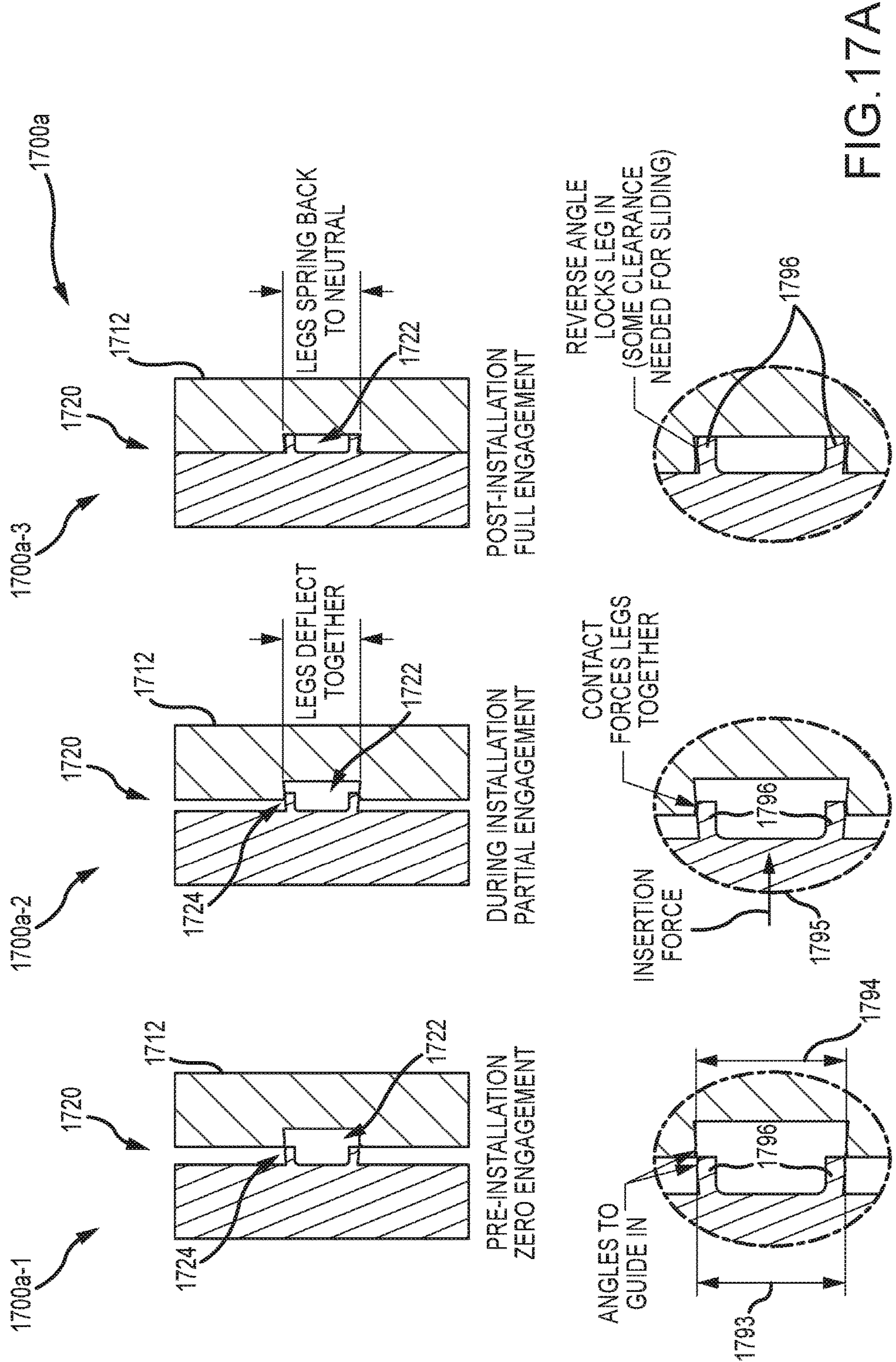
FIG. 17A shows cross sectional views of a guide including a dove tail female groove configured for engagement with a split male rail according to examples herein.
Figure 17B:
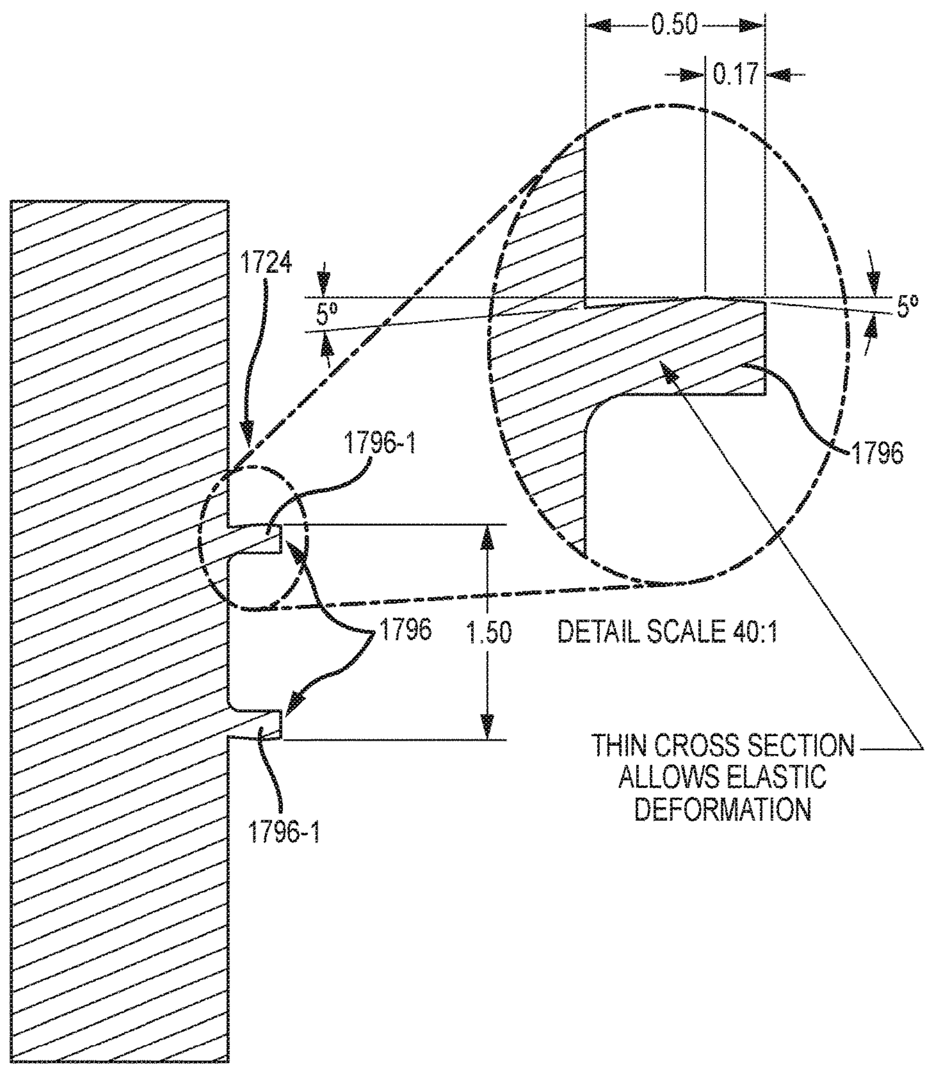
FIG. 17B shows a split male rail according to the example in FIG. 17A.
Figure 17C:
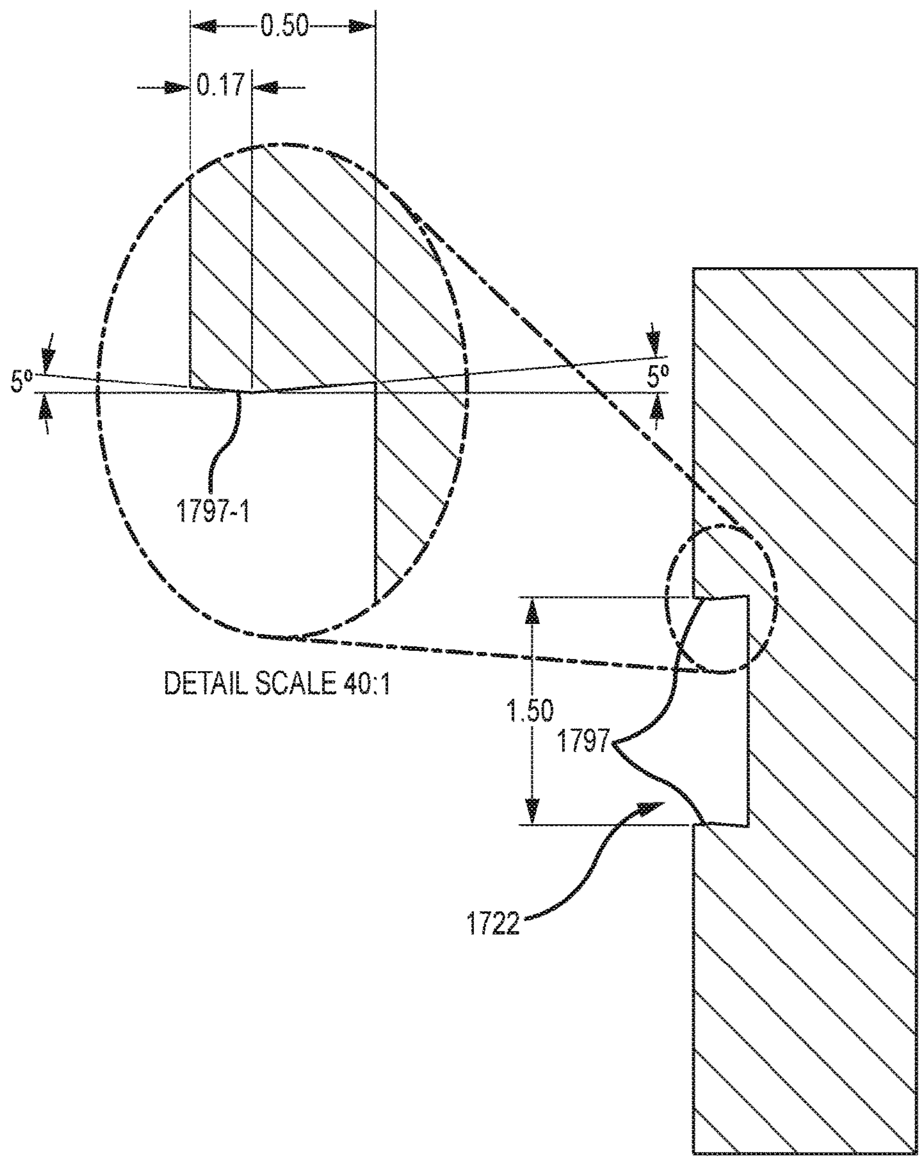
FIG. 17C shows a dove tail female groove according to the example in FIG. 17A.

FIGS. 17A-C shows cross sectional views of an attachment system 1700*a*including guides according to further examples herein. The guide 1720 includes a first guide incorporated into temple 1712 and comprising a female groove 1722 having a generally U-shaped geometry. The groove 1722 is configured for engagement with a rail 1724 of a second guide, e.g., which may be provided on an electronic device, the rail 1724 also having a generally U-shaped cross section to form a slidable joint with the groove 1722. The slidable joint formed by the first and second guides is illustrated at different stages 1700*a*-1 through 1700*a*-3 of coupling the rail to the groove. The rail 1724 is a split rail comprising a pair of legs 1796. The rail 1724 is configured to couple to the groove 1722 by a snap fit. For example, the rail 1724 may be sized for a press fit into the groove 1722, as described herein. The rail 1724 has a first rail width 1793 at its widest location, which may be an intermediate location between the base and top of the rail, for example a midpoint location. The groove may have a first groove width 1794 at its narrowest location, which may he an intermediate location along the height of the groove, for example a midpoint location. The first rail width 1793 may be greater than the first groove width 1794 such that the rail may be press fit into the groove.

In a first stage 1700*a*-1 (e.g., pre-installation), the rail and groove are shown adjacent one another prior to inserting the rail into the groove. In this stage, the rail and groove are in a zero engagement state with the rail decoupled from the groove and freely movable with respect to the groove. In a second stage 1700*a*-2 (e.g., during installation), the rail is partially inserted into the groove by moving the rail in a direction 1795 of the insertion force. At this stage 1700*a*-2, the rail and groove are in a partial engagement state. Due to the width of the rail at its widest location being greater than a width of the groove at its narrowest location the legs 1796 may deflect inward (e.g., toward one another) when the rail is moved in the direction 1795. The rail is fully inserted into the groove by further movement of the rail along the direction 1795 until the rail and groove are provided in a third stage 1700*a*-3 (e.g., post-installation). As the rail is further inserted into the groove, the legs 1796 may deflect outward (e.g., spring back to their neutral position) to lock the rail into engagement with the groove. At this stage 1700*a*-3, the rail and groove are in a full engagement state. In this stage 1700*a*-3, the top of the rail (e.g., ends of the legs) may abut the surface at the base of the groove. In some example, some clearance may remain between sidewalls of the rail and sidewalls of the groove to facilitate sliding of the rail within the groove.

FIG. 17B shows a cross sectional view of the second guide including the split rail with a partial detail view of one of the legs 1796 of the split rail. The split rail comprises a pair of legs 1796 including a first leg 1796-1 and a second leg 1796-2 spaced apart from the first leg 1796-1. A width of the rail may vary along its height. For example, the rail may have a first rail width at the base of the rail, a second rail width at the top of the rail and a third rail width at an intermediate location of the rail between the base and the top. The first, second, and/or third rail widths may be different. In some examples, the first rail width may be substantially the same as the third rail width and may be less than the second rail width. The intermediate location may be referred to as the widest location of the rail. A distance between the legs 1796 may also vary. In some example, the distance between the legs may be the same along the height of the rail.

FIG. 17C shows a cross sectional view of the first guide including the groove 1722 with a partial detail view of one of the sidewalls 1797-1 of the groove. The groove comprises a generally U-shaped groove defined by sidewalls 1797 which narrow from a base to an intermediate location along the height of the groove and then widen from the intermediate location to the top (e.g., opening) of the groove. As such, the width of the groove varies along the height of the groove such that the groove has a first groove width at the base of the groove, a second groove width at the top of the groove and a third groove width at an intermediate location of the groove between the base and the top. The first, second, and/or third groove widths may be different. In some examples, the first groove width may be substantially the same as the third groove width and may be greater than the second groove width. In this regard, the intermediate location may be referred to as the narrowest location of the groove. In some example, the first and/or third groove widths may be greater than the first and/or third rail widths to provide clearance for sliding movement of the rail 1724 within the groove 1722. In other examples, the location of the first and second guides may be reversed. That is, a temple may include a split rail similar to split rail 1724 of the example in FIGS. 17A-C, and an electronic device or an intermediate component attachable to the electronic device may include a groove 1722 similar to the groove 1722 of the example in FIGS. 17A-C and configured for coupling to a split rail as described herein.

Guides according to the present disclosure may be provided on a finished surface of the temple. That is, the groove or tracks, or rail or rails of the guide may be formed such that they comprise a finished surface of the temple which does not distract from the cosmetic appearance of the eyewear. Furthermore, guides according to the present disclosure may include low profile guides which may be incorporated into relatively thin temples of eyewear. For example, the height of a rail (e.g., the split rail 1724) may be about 1 mm or less and a width of the rail may be about 3 mm or less. In a specific example, a split rail having a height of about 0.5 mm and a width of about 1.5 mm was implemented and shown to effectively couple an electronic device to a temple of an eyewear frame. The thickness of each of the legs may in some examples be less than about 0.5 mm and in some examples, less than about 0.3 mm. Such relatively thin cross section of the legs may allow for elastic deformation when moving from the first 1700*a*-1 through the second 1700*a*-2 and to the third 1700*a*-3 stages described with reference with FIG. 17A. Low profile guides according to the present disclosure may have the added advantage that they may be nearly unperceivable by an onlooker without close inspection of the eyewear. In this regard, guides according to the examples herein may function to preserve the aesthetic look of the eyewear. In some examples, a guide in the form of a male rail according to the present disclosure may be about 3 mm wide or less, about 1.5 mm high or less, and between about 10 mm and about 145 mm long. In some examples, a guide in the form of a female groove may be about 4 mm wide or less, about 1.5 mm deep or less, and between about 10mm and about 145 mm long. In some example, a guide may be in excess of about 40 mm long. In some examples, a guide may be in excess of about 80 mm long. In some cases a guide may be in excess of 145 mm long as in the case of a guide on a bifurcated temple. The guide may be located on the outside side of a temple. The guide may be located on the inside side of a temple. The guide may be located on the top edge of the temple. The guide may be located on the bottom edge of the temple.

Figure 18A:
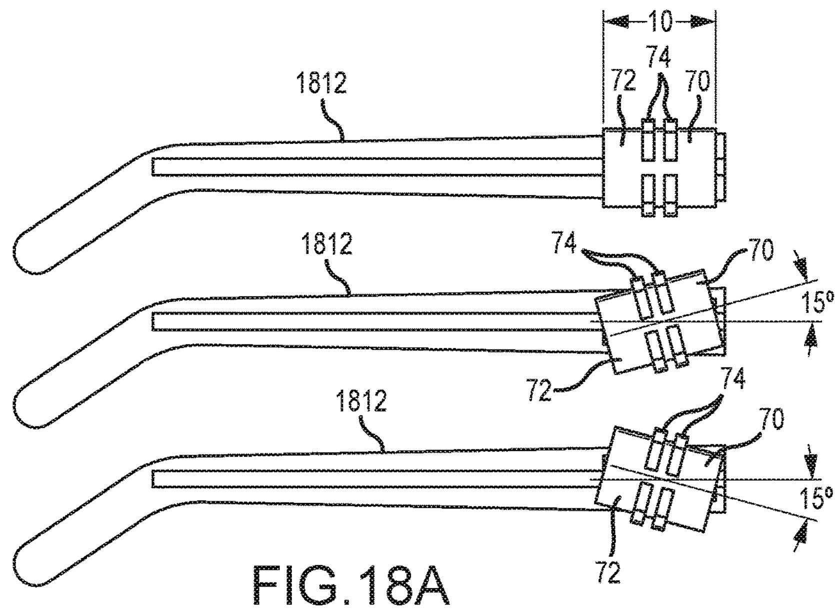
FIGS. 18A-18C are views of an electronic device slidably and pivotably coupled to a temple according to some examples herein.
Figure 18B:
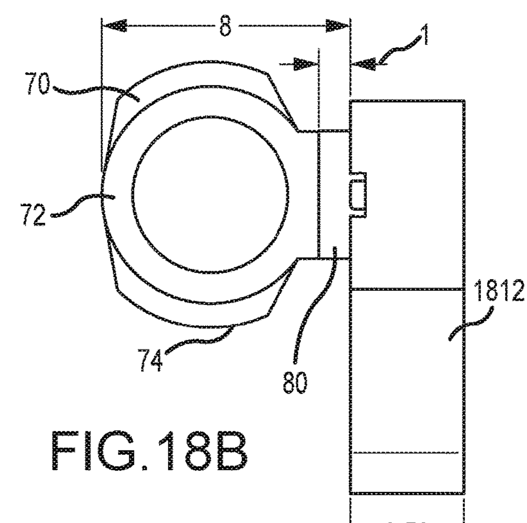
Figure 18C:
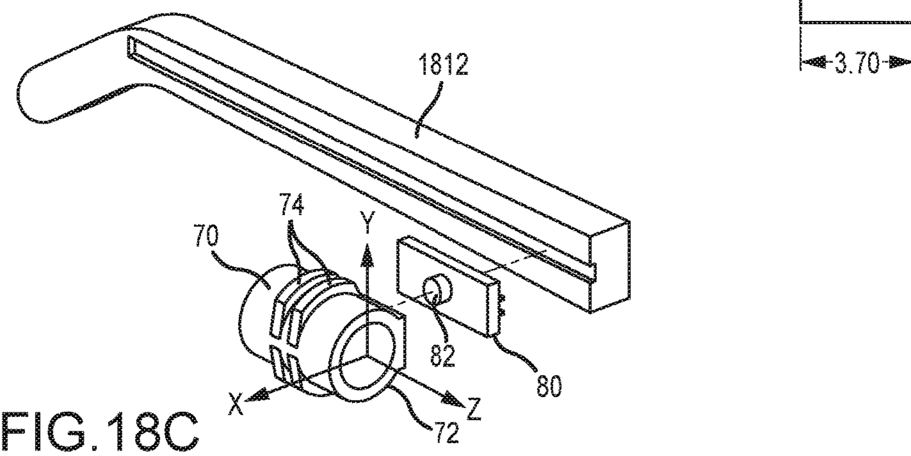
Figure 19A:
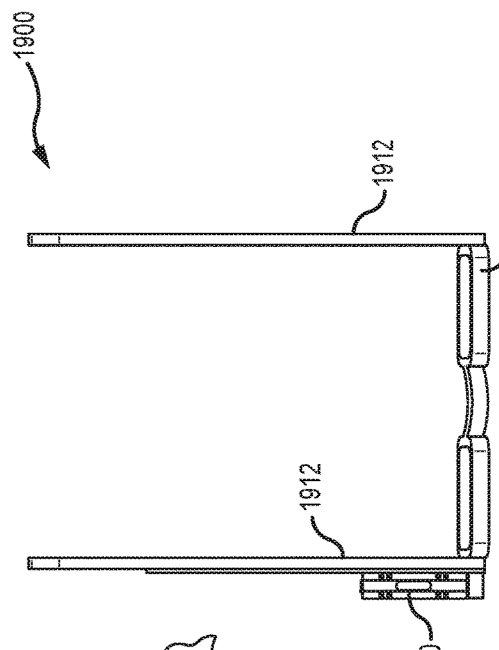
FIGS. 19A-19D are top, front, side, and partial isometric views of a system according to some examples of the present disclosure.
Figure 19B:
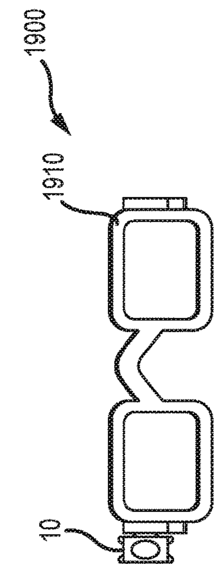
Figure 19D:
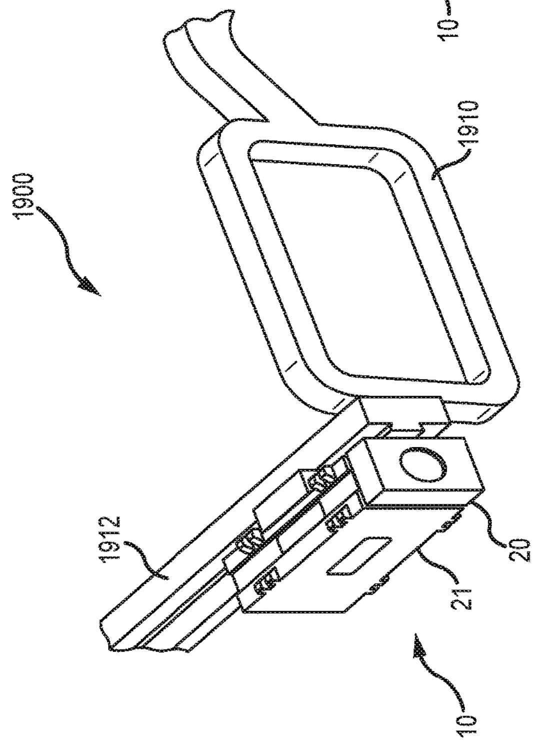
Figure 19C:
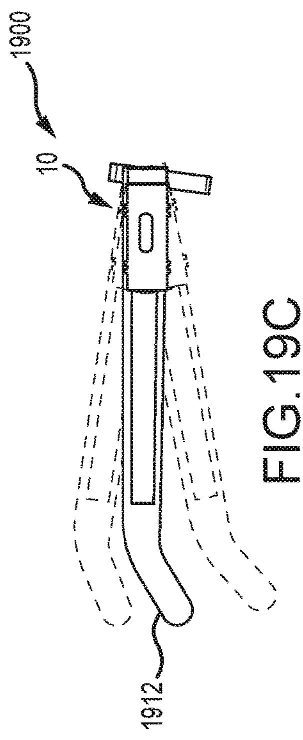

In some examples, the electronic device (e.g., camera) may be pivotably coupled to the temple, for example using a hinge joint or a pivot joint, e.g., as illustrated in the example in FIGS. 18A-18C. FIGS. 18A-18C are views of an electronic device slidably and pivotably coupled to a temple according to further examples herein. The electronic device may be a camera 70 which includes an image capture device enclosed within a housing 72. The camera 70 may further include surface features 74 incorporated into the housing and configured for engagement with a band. The camera 70 may include an image capture device.

The camera 70 may be coupled to the temple using an intermediate component (e.g, an interface 80), which may be pivotably coupled to the camera 70 via the pivot joint 82. In some examples, the pivot joint 82 may enable rotation of the camera 70 and thereby a rotation of the image capture device, about an axis of the camera, e.g., the x axis of the camera. One advantage may be the ability to align the image capture device with a desired object or scene to be capture even if the temple is otherwise angled relative to the object or scene. The pivot joint 82 may be configured to enable up to 20 degrees of upward and downward rotation about the x axis. In some examples, the pivot joint 82 may be configured to enable up to about 15 degrees of upward and/or downward rotation of the camera 70. As described herein, the intermediate component 80 may comprise a rail or a groove for slidably engaging with a groove or a rail on the temple 1812. In the specific example illustrated, the interface includes a split rail of the type described with reference to FIG. 17 and a groove configured for cooperating fit with the rail. In some examples, the camera 70 may be coupled to the temple via a hinge joint having a hinge axis generally parallel to a longitudinal axis of the temple. In such examples, the hinge joint may be operable to rotate the camera about the longitudinal axis of the temple, for example to change an orientation of the image capture device from a portrait orientation to a landscape orientation and vice versa.

FIGS. 19A-19D and 20A-20D show top, front, side, and partial isometric views of systems according to some examples of the present disclosure. System 1900 in FIG. 19 may include an eyewear frame 1910 including a temple 1912. The system 1900 may further include an electronic device, for example camera 10, as described previously with reference to FIGS. 13A-13E. The camera 10 may be slidably engaged with the temple 1912 via a shoe (e.g., shoe 1434 of FIG. 14A). The camera 10 may include a forward portion 20 which comprises an image capture device. The forward portion 20 may be pivotably coupled to an aft portion 21 of the camera such that an orientation of the image capture device 12 may be changed, for example to compensate for misalignment of the camera 10 with a desired line of sight of the camera. In some examples, the camera 10 may include a ball and socket joint which may enable rotation of the forward portion about one or more axes parallel to one or more of the axes (e.g., the x-axis, the y-axis, and the z-axis) of the camera 10.

The camera 10 may be coupled to the temple 1912 such that the camera 10 is generally parallel with a longitudinal axis of the temple 1912. In some examples, the longitudinal axis of the temple 1912 may be aligned with a neutral axis which may be generally parallel to a line of sight of the user and may thus be aligned with a desired line of sight for the capture of an image (e.g., still image, or a video image). In some examples, the longitudinal axis may not be aligned with the neutral axis but may instead be angled upward or downward with respect to the neutral axis. For example, the temple may be in a first inclined position (shown in dashed line), which may be angled upward relative to the neutral position, thus causing the image capture device of the camera to be oriented downward relative to a desired object or scene. In other examples, the temple may be in a second inclined position (shown in dashed line), which may be angled downward relative to the neutral position, thus causing the image capture device of the camera to be oriented upward relative to a desired object or scene. In this example, an image capture device of the camera 10 may be rotated about an axis that is parallel to the x axis of the camera 10. That is the forward portion of camera 10 may be rotated and the rotation of the forward portion about an axis that is parallel to the x axis would effect a change in orientation of the image capture device in an upward or downward direction relative to the line of sight of the user.

With further reference to FIGS. 20A-20D, system 2000 may include an eyewear frame 2010 comprising a temple 2012. The system 2000 may further include an electronic device, for example camera 10, as described previously with reference to FIGS. 13A-13E and FIG. 19. The camera 10 may be slidably engaged with the temple and the forward portion of the camera may be pivotably coupled to an aft portion of the camera such that an orientation of the image capture device may be changed.

The camera 10 may be coupled to the temple 2012 such that the camera 10 is generally parallel with a longitudinal axis of the temple 2012, which in some examples may be generally aligned with a neutral axis and thus may be aligned with a desired line of sight. In some examples, the temple may instead be angled inwardly or outwardly with respect to the neutral axis. For example, the temple may be in a first deflected position (shown in dashed line), which may be angled inward relative to the neutral axis, thus causing the image capture device of the camera to be oriented outward relative to a desired object or scene. In other examples, the temple may be in a second deflected position (shown in dashed line), which may be angled outward relative to the neutral axis, thus causing the image capture device of the camera to be oriented inward relative to a desired object or scene. In such examples, the camera may be rotated about an axis which is generally parallel to the y axis of the camera. Rotation about an axis which is parallel to the y axis of the camera may effect a change in orientation of the image capture device in a side to side or inward and outward direction with respect to a line of sight of the user.

Figure 20A:
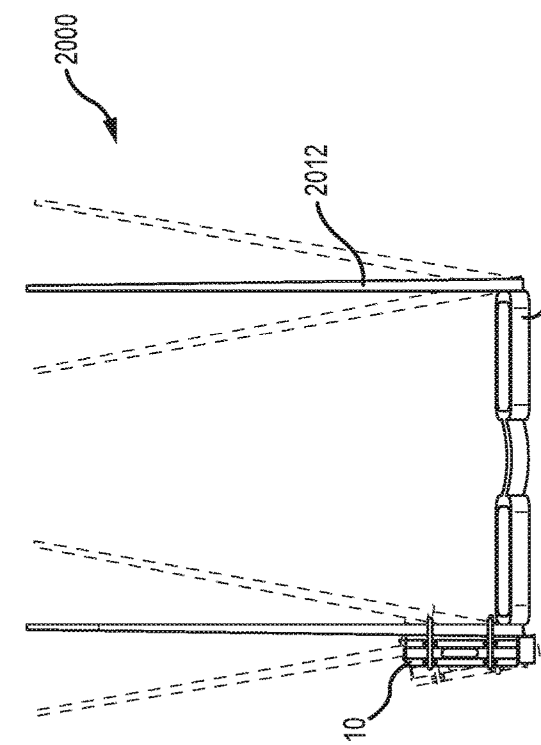
FIGS. 20A-20D are top, front, side, and partial isometric views of a system according to further examples of the present disclosure.
Figure 20B:
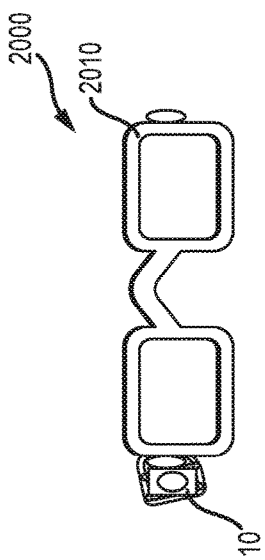
Figure 20D:
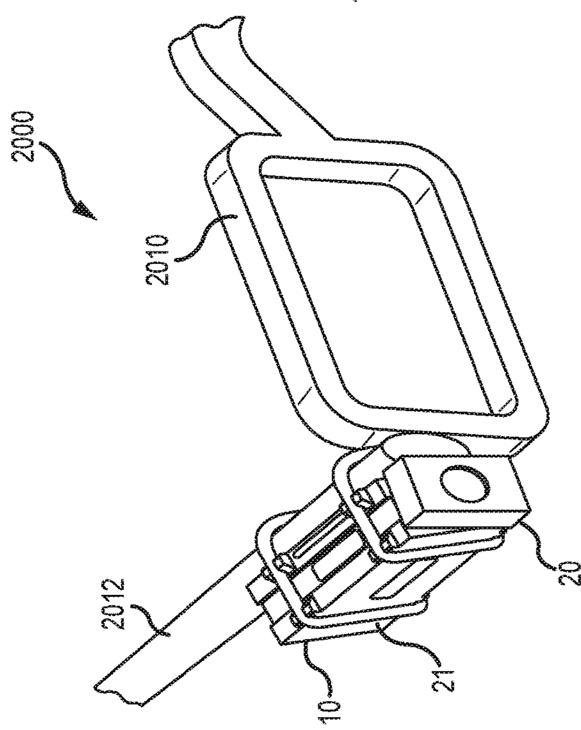
Figure 20C:
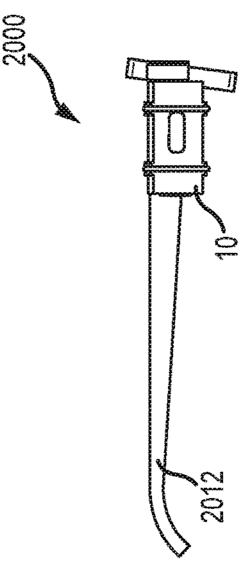

In further examples, the image capture device may be angularly misaligned. For example, by reasons of an irregularly shaped temple 2012, the x and y axes of the camera 10 and/or the image capture device may be rotated by an angle relative to the x and y axes of the eyewear frame. As such, an image captured by the camera in such an orientation may have an angular misalignment (e.g., be rotated about the z axis). Such misalignment may be resolved according to the examples herein by rotation of the forward portion of the image capture device about the z axis as illustrated in FIG. 20D.

FIG. 21 shows yet another example of an electronic device according to the present disclosure, which may, by way of example, be a camera 90. The electronic device (e.g., camera 90) may include some or all of the features of electronic devices described herein. The camera 90 in this example includes a male rail 94 which is located on a bottom side 95 of the camera 90. When the camera 90 is coupled to a temple according to the examples herein, the bottom side 95 of the camera 90 is provided opposite the temple such that the guide in the form of a male rail 94 is in engagement with a guide on the temple. As will be appreciated, the rail 94 may extend along the length of the camera or partially along the length of the camera. For example, the rail 94 may have a length $L_R$ which is less than a length $L_C$ of the camera 90. The rail 94 may be positioned proximate the aft end 92 of the camera. The rail 94 may be spaced from the front end 91 of the camera 90 by a distance 96. Positioning of the rail 94 a distance 96 aft of the front end of the camera may enable the front end 91 of the camera 90, to be positioned in line with the front of the eyewear or slightly in front of the eyewear while the camera remains engaged with the guide on the temple. While the specific example illustrated shows a camera including a guide in the form of a rail, in other examples, the camera may include a guide in the form of a groove. In some examples, the rail may be part of a shoe attached to the electronic device. The rail incorporated in the shoe may similarly be spaced from a front end of the shoe to enable placement of the camera in line with or ahead of the eyewear frame.

Figure 22:
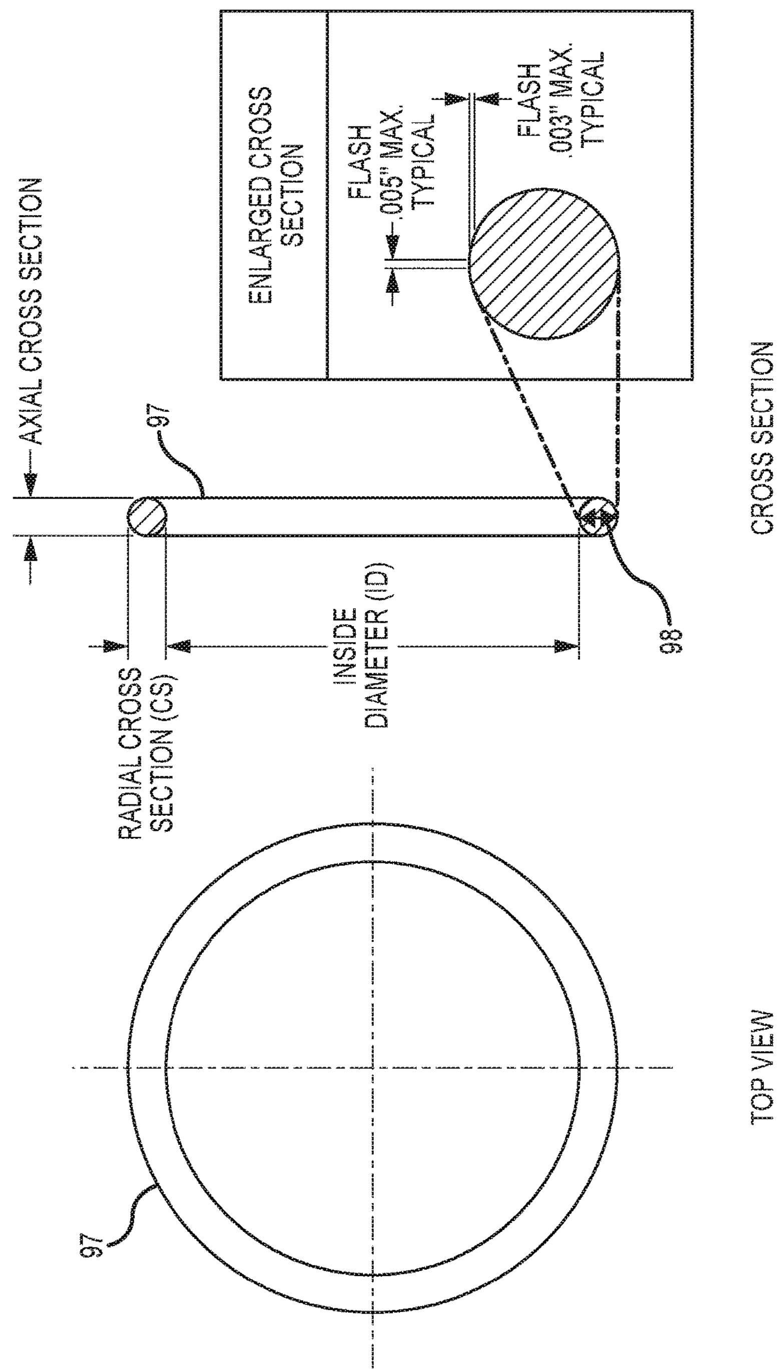
FIG. 22 is a view and a cross section of a stretchable band in the form of an O-ring according to an example of the present disclosure.

FIG. 22 shows an example of a stretchable band in the form of an O-ring according to examples of the present disclosure. The O-ring 97 may be generally circular and may have an outside diameter (ID). In some examples, an outside diameter (ID) of the O-ring 97 may range from about 8 mm to about 16 mm. The O-ring may have a rounded cross section, for example a circular cross section as illustrated in FIG. 22. A cross-sectional diameter 98 (e.g., the radial cross section diameter, the axial cross section diameter, or both) of the O-ring 97 may range from about 1 mm to about 2 mm. In some examples, the O-ring may be circular in cross section and the radial cross section diameter and axial cross section diameters of the O-ring may be about 1 mm. A rounded cross section of the O-ring may facilitate sliding of the O-ring along the temple without excessive twisting of the O-ring or otherwise impeding the movement of the electronic device along the temple. The O-ring 97 may be made from rubber, for example Buna N A70 durometer rubber. In some examples, the stretchable band may be an elastic ring made from other elastic materials such as silicon or ethylene propylene diene terpolymer (EPDM). One or more O-Rings can be applied to secure the electronic device to the eyewear temple and also the temple guide when it is present. The O-Ring can be applied in a manner whereby it covers one or more outer surfaces of the electronic device and the inside side of the eyewear temple. The O-Ring can be used to completely encircle the electronic device and the eyewear temple including the eyewear guide when and if present. One or more surface features located on the electronic device can receive the O-ring and prevent the O-Ring from becoming disengaged when the electronic device is being moved from a point near the front of the eyewear temple to a point near the back of the eyewear temple. The surface feature can form a depression on the surface of the electronic device for receiving the O-Ring. The depression can have a depth ranging from 0.50 mm-2.2 mm. When an O-Ring is used having a cross section of 1.0 mm the surface depression ranges from 0.75 mm to 1.25 mm.

By example and without limitation, embodiments are disclosed according to the following enumerated paragraphs:

A1. An electronic device system comprising:

an eyewear frame including a temple and a first guide integral with the temple, the temple having a finished surface, and the first guide extending between a first location on the temple and a second location on the temple, wherein the first guide is formed on a side of the temple and extends partially through a thickness of the temple or protrudes from the temple, the first guide comprising a base and at least one sidewall adjacent to the base, the finished surface of the temple including surfaces of the base and the at least one sidewall;

an electronic device movably coupled to the temple, the electronic device comprising a second guide coupled to the first guide; and an attachment system securing the electronic device to the temple, whereby the electronic device is movable along the guide while remaining secured to the temple.

A2. The electronic device system according to paragraph A1, wherein the first guide comprises a rail or a groove.

A3. The electronic device system according to paragraph A1 or A2, wherein the first guide is formed on an outside side of the temple, and wherein the first location is at a forward end of the temple and the second location is at a distance of about ⅓ of a length of the temple from an aft end of the temple.

A4. The electronic device system according to paragraph A1, wherein the first guide is a groove and a depth of the groove is 2 mm or less.

A5. The electronic device system according to paragraph A1, wherein the first guide is a groove and a width of the groove is 4 mm or less.

A6. The electronic device system according to paragraph A1, wherein the first guide is a groove and a length of the groove is between 10 mm and 145 mm.

A7. The electronic device system according to any of the paragraphs A1 through A6, wherein the electronic device comprises surface features configured to engage with the attachment system, and wherein the attachment system comprises an elastic band having a rounded cross-section and wherein a diameter of the cross-section is 2 mm or less.

A8. The electronic device system according to paragraph A7, wherein the temple comprises a first portion and a second portion offset from the first portion by an offset distance, the offset distance greater than or equal to a thickness of the elastic band.

A9. The electronic device system according to any of the paragraphs A1 through A8, wherein the temple comprises a metal portion and wherein the first guide is located in the metal portion.

A10. The electronic device system according to any of the paragraphs A1 through A8, the eyewear frame further comprising a metallic strip in the temple configured to engage with a magnet coupled to or embedded in the electronic device.

A11. The electronic device system according to any of the paragraphs A1 through A10, wherein the electronic device is a camera removably coupled to the temple.

A12. The electronic device system according to any of the paragraphs A1 through A10, wherein the camera is pivotably coupled to the temple.

A13. The electronic device system according to any of the paragraphs A1 through A10, wherein the electronic device is a camera comprising an image capture device configured to be angled relative to an axis of the camera.

A14. The electronic device system according to any of the paragraphs A1 through A10, wherein the electronic device is a camera and wherein the camera is waterproof.

A15. The electronic device system according to any of the paragraphs A1 through A10, wherein the electronic device is a camera and wherein the camera comprises a compliant material provided on an external surface of the housing.

A16. The electronic device system according to any of the paragraphs A1 through A10, wherein the electronic device is a camera and wherein the camera is configured to capture an image responsive to a tap of the temple or responsive to a voice command.

A17. The electronic device system according to any of the paragraphs A1 through A10, wherein the electronic device is a camera, the camera comprising a camera front end and wherein the camera is configured to position the camera front end in line with or in front of the eyewear frame when the camera is moved to the first location on the temple.

A18. The electronic device system according to any of the paragraphs A1 through A10, wherein the electronic device is a camera having a width and a height of about 8 mm each and a length of about 25 mm to about 30 mm.

A19. The electronic device system according to any of the paragraphs A1 through A10, wherein the electronic device is a camera having a volume of less than 6,000 cubic millimeters.

A20. The electronic device system according to any of the paragraphs A1 through A10, wherein the electronic device is a camera having a volume of less than 3,000 cubic millimeters.

A21. The electronic device system according to any of the paragraphs A1 through A10, wherein the electronic device is a camera having a volume of less than 2,000 cubic millimeters.

A22. The electronic device system according to any of the paragraphs A1 through A10, wherein the electronic device is a camera having a height between 6 mm and 12 mm.

A23. The electronic device system according to any of the paragraphs A1 through A10, wherein the electronic device is a camera having a width between 6 mm and 12 mm.

A24. The electronic device system according to any of the paragraphs A1 through A10, wherein the electronic device is a camera having a length between 12 mm and 45 mm.

A25. The electronic device system according to any of the paragraphs A12 through A24, wherein the camera comprises a processor and memory comprising processor-executable instructions for centering an image captured by the camera, the processor-executable instructions configured to program the camera to detect a center of an image and relocate the center of the image by cropping the image.

A26. The electronic device system according to paragraph A25, wherein the processor-executable instructions are further configured to program the camera to center the image in a vertical direction by determine a position of the horizon by detecting a color difference between a first object in the captured image which corresponds to the sky and a second object in the captured image which corresponds to the ground, and further configured to program the camera to center the image in a horizontal direction by detecting a horizontal center of the image and cropping the image in the horizontal direction such that the horizontal center is equally spaced between left and right sides of the image.

A27. The electronic device system according to any of the paragraph A1 through A26, further comprising one or more lenses coupled to the eyewear frame, the one or more lenses comprising a prescription lens, a non-prescription lens, a tinted lens, a changeable tint lens, a variable focus lens, a switchable focus lens, or combinations thereof.

A28. An electronic device system comprising:

an eyewear frame including a temple and a first securing guide integral with the temple, the temple having a finished surface, and the first securing guide extending between a first location on the temple and a second location on the temple, wherein the first securing guide is formed on a side of the temple and extends partially through a thickness of the temple or protrudes from the temple, the first securing guide comprising a base and at least one sidewall adjacent to the base, the finished surface of the temple including surfaces of the base and the at least one sidewall;

an electronic device movably coupled to the temple, the electronic device comprising a second securing guide coupled to the first securing guide; and wherein the first and second securing guides are configured to maintain the electronic device on the temple as the electronic device is moved along the first guide.

A29. The electronic device system according to paragraph A28, wherein the first securing guide comprises a groove or a rail.

A30. The electronic device system according to paragraph A28 or A29, wherein at least one of the first or second securing guides has a cross-sectional shape configured to maintain the electronic device on the temple as the electronic device is moved along the first guide.

Although the present disclosure includes, by way of example, illustration and description of some embodiments, it will be understood by those skilled in the art that several modifications to the described embodiments, as well as other embodiments are possible without departing from the spirit and scope of the present invention. It will be appreciated that any of the components, features, or aspects from any of the disclosed embodiments may be used in combination with one another, without limitation, and without departing from the scope of the present disclosure.

What is claimed is:

1. An electronic device system comprising:

an eyewear frame including a temple and a first guide integral with the temple, the temple having a finished surface, and the first guide extending between a first location on the temple and a second location on the temple, wherein the first guide is formed on a side of the temple and extends partially through a thickness of the temple, the first guide comprising a base and at least one sidewall adjacent to the base, the finished surface of the temple including surfaces of the base and the at least one sidewall;

an electronic device movably coupled to the temple, the electronic device comprising a second guide coupled to the first guide; and an attachment system for securing the electronic device to the temple, whereby the electronic device is movable along the guide while remaining secured to the temple, wherein the eyewear frame further comprises a metallic strip in the temple configured to engage with a magnet coupled to or embedded in the electronic device thereby providing, at least in part, the attachment system for securing the electronic device to the temple.

2. The electronic device system of claim 1, wherein the first guide comprises a groove.

3. The electronic device system of claim 1, wherein the first guide is formed on an outside side of the temple, and wherein the first location is at a forward end of the temple and the second location is at a distance of about ⅓ of a length of the temple from an aft end of the temple.

4. The electronic device system of claim 1, wherein the first guide is a groove and a depth of the groove is 2 mm or less.

5. The electronic device system of claim 1, wherein the first guide is a groove and a width of the groove is 4 mm or less.

6. The electronic device system of claim 1, wherein the first guide is a groove and a length of the groove is between 10 mm and 145 mm.

7. The electronic device system of claim 1, wherein the electronic device comprises surface features configured to engage with the attachment system, and wherein the attachment system comprises an elastic band having a rounded cross-section and wherein a diameter of the cross-section is 2 mm or less.

8. The electronic device system of claim 7, wherein the temple comprises a first portion and a second portion offset from the first portion by an offset distance, the offset distance greater than or equal to a thickness of the elastic band.

9. The electronic device system of claim 1, wherein the electronic device is a camera removably coupled to the temple.

10. The electronic device system of claim 1, wherein the camera is pivotably coupled to the temple.

11. The electronic device system of claim 1, wherein the electronic device is a camera comprising an image capture device configured to be angled relative to an axis of the camera.

12. The electronic device system of claim 1, wherein the electronic device is a camera and wherein the camera is waterproof.

13. The electronic device system of claim 1, wherein the electronic device is a camera and wherein the camera comprises a compliant material provided on an external surface of the housing.

14. The electronic device system of claim 1, wherein the electronic device is a camera and wherein the camera is configured to capture an image responsive to a tap of the temple or responsive to a voice command.

15. The electronic device system of claim 1, wherein the electronic device is a camera, the camera comprising a camera front end and wherein the camera is configured to position the camera front end in line with or in front of the eyewear frame when the camera is moved to the first location on the temple.

16. The electronic device system of claim 1, wherein the electronic device is a camera having a width and a height of about 8 mm each and a length of about 25 mm to about 30 mm.

17. The electronic device system of claim 1, wherein the electronic device is a camera having a volume of less than 6,000 cubic millimeters.

18. The electronic device system of claim 1, wherein the electronic device is a camera having a volume of less than 3,000 cubic millimeters.

19. The electronic device system of claim 1, wherein the electronic device is a camera having a volume of less than 2,000 cubic millimeters.

20. The electronic device system of claim 1, wherein the electronic device is a camera having a height between 6 mm and 12 mm.

21. The electronic device system of claim 1, wherein the electronic device is a camera having a width between 6 mm and 12 mm.

22. The electronic device system of claim 1, wherein the electronic device is a camera having a length between 12 mm and 45 mm.

23. The electronic device system of claim 10, wherein the camera comprises a processor and memory comprising processor-executable instructions for centering an image captured by the camera, the processor-executable instructions configured to program the camera to detect a center of an image and relocate the center of the image by cropping the image.

24. The electronic device system of claim 23, wherein the processor-executable instructions are further configured to program the camera to center the image in a vertical direction by determine a position of the horizon by detecting a color difference between a first object in the captured image which corresponds to the sky and a second object in the captured image which corresponds to the ground, and further configured to program the camera to center the image in a horizontal direction by detecting a horizontal center of the image and cropping the image in the horizontal direction such that the horizontal center is equally spaced between left and right sides of the image.

25. The electronic device system of claim 1, further comprising one or more lenses coupled to the eyewear frame.

26. An electronic device system comprising:

an eyewear frame including a temple and a first securing guide integral with the temple, the temple having a finished surface, and the first securing guide extending between a first location on the temple and a second location on the temple, wherein the first securing guide is formed on a side of the temple and extends partially through a thickness of the temple, the first securing guide comprising a base and at least one sidewall adjacent to the base, the finished surface of the temple including surfaces of the base and the at least one sidewall;

an electronic device movable coupled to the temple, the electronic device comprising a second securing guide coupled to the first securing guide; and wherein the first and second securing guides are configured to maintain the electronic device on the temple as the electronic device is moved along the first guide.

27. The electronic device system of claim 26, wherein the first securing guide comprises a groove.

28. The electronic device system of claim 26, wherein at least one of the first or second securing guides has a cross-sectional shape configured to maintain the electronic device on the temple as the electronic device is moved along the first guide.

29. An electronic device system comprising:

an eyewear frame including a temple and a first guide integral with the temple, the first guide extending between a first location on the temple and a second location on the temple, wherein the first guide is formed on an outside side of the temple and extends partially through a thickness of the temple, the first guide comprising a base and at least one sidewall adjacent to the base;

an electronic device movably coupled to the temple, the electronic device comprising a second guide configured to be coupled to the first guide; and an attachment system for securing the electronic device to the temple, whereby the electronic device is movable along the guide while remaining secured to the temple; and wherein the electronic device is a camera comprising a processor and memory comprising processor-executable instructions for centering an image captured by the camera, the processor-executable instructions configured to program the camera to detect a center of an image and relocate the center of the image including programming the camera to center the image in a vertical direction by determining a position of a horizon by detecting a color difference between a first object in the captured image and a second object in the captured image, and programming the camera to center the image in a horizontal direction by detecting a horizontal center of the image and cropping the image in the horizontal direction such that the horizontal center is equally spaced between left and right sides of the image.

30. An electronic device system comprising:

an eyewear frame including a temple and a first guide integral with the temple, the first guide extending between a first location on the temple and a second location on the temple, wherein the first guide is formed on an outside side of the temple and extends partially through a thickness of the temple, the first guide comprising a base and at least one sidewall adjacent to the base, and wherein the first location is at a forward end of the temple and the second location is at a distance of about ⅓ of a length of the temple from an aft end of the temple;

an electronic device movably coupled to the temple, the electronic device comprising a second guide configured to be coupled to the first guide; and an attachment system for securing the electronic device to the temple, whereby the electronic device is movable along the guide while remaining secured to the temple.

31. An electronic device system comprising:

an eyewear frame including a temple and a first guide integral with the temple, the first guide extending between a first location on the temple and a second location on the temple, wherein the first guide is formed on an outside side of the temple and extends partially through a thickness of the temple, the first guide comprising a base and at least one sidewall adjacent to the base;

an electronic device movably coupled to the temple, the electronic device comprising a second guide configured to be coupled to the first guide; and an attachment system for securing the electronic device to the temple, whereby the electronic device is movable along the guide while remaining secured to the temple, wherein the electronic device comprises surface features configured to engage with the attachment system, and wherein the attachment system comprises a band having a rounded cross-section and wherein a diameter of the cross-section is 2 mm or less.

32. The electronic device system of claim 31, wherein the temple comprises a first portion and a second portion offset from the first portion by an offset distance, the offset distance greater than or equal to a thickness of the band.

* * * * *